US009772738B2

(12) United States Patent
Na et al.

(10) Patent No.: US 9,772,738 B2
(45) Date of Patent: Sep. 26, 2017

(54) MOBILE TERMINAL HAVING A SCREEN OPERATION AND OPERATION METHOD THEREOF

(71) Applicant: Samsung Electronics Co., Ltd., Gyeonggi-do (KR)

(72) Inventors: Minwook Na, Gyeonggi-do (KR); Jongwoo Shin, Gyeonggi-do (KR); Kangsik Choi, Gyeonggi-do (KR); Minsoo Kwon, Seoul (KR); Jeeyeun Wang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 640 days.

(21) Appl. No.: 13/774,167

(22) Filed: Feb. 22, 2013

(65) Prior Publication Data

US 2013/0227450 A1 Aug. 29, 2013

(30) Foreign Application Priority Data

Feb. 24, 2012 (KR) .................. 10-2012-0019352

(51) Int. Cl.
*G06F 3/0488* (2013.01)
*H04M 1/67* (2006.01)
*G06F 3/048* (2013.01)

(52) U.S. Cl.
CPC .......... *G06F 3/048* (2013.01); *G06F 3/04883* (2013.01); *H04M 1/67* (2013.01); *H04M 2250/22* (2013.01); *H04M 2250/52* (2013.01)

(58) Field of Classification Search
CPC ............... H04M 1/67; H04M 2250/52; H04M 2250/22; G06F 3/04883; G06F 3/048
See application file for complete search history.

(56) References Cited

U.S. PATENT DOCUMENTS 5,877,777 A * 3/1999 Colwell .................. G06T 13/60
345/473
6,985,148 B2 * 1/2006 Liang ...................... G06T 13/60
345/419

(Continued)

FOREIGN PATENT DOCUMENTS

CN 1692329 A 11/2005
CN 101814006 A 8/2010

(Continued)

OTHER PUBLICATIONS

Han, Jeff. YouTube video uploaded Aug. 3, 2006. TED Talk demonstrating touch interface and visual feedback. Retrieved Nov. 2, 2015. 6 pages.*

(Continued)

*Primary Examiner* — Amy M Levy
(74) *Attorney, Agent, or Firm* — Cha & Reiter, LLC

(57) ABSTRACT

A mobile terminal and screen operation method for the same are disclosed. The screen operation method includes: displaying a screen containing an amorphous object that is changeable at least in part to a specific form according to an input event; receiving a generated input event; and displaying a concrete object that is generated from the amorphous object by modifying the amorphous object at least in part according to the input event.

30 Claims, 15 Drawing Sheets

(56) References Cited

U.S. PATENT DOCUMENTS

| | | | |
|---|---|---|---|
| 8,854,433 B1* | 10/2014 | Rafii | G06F 3/017 |
| | | | 348/42 |
| 2002/0175896 A1 | 11/2002 | Vaananen et al. | |
| 2003/0117398 A1* | 6/2003 | Hubrecht et al. | 345/423 |
| 2004/0117727 A1* | 6/2004 | Wada | 715/500 |
| 2005/0219223 A1* | 10/2005 | Kotzin et al. | 345/173 |
| 2008/0036743 A1 | 2/2008 | Westerman et al. | |
| 2008/0178126 A1* | 7/2008 | Beeck | G06F 3/017 |
| | | | 715/863 |
| 2008/0252616 A1* | 10/2008 | Chen | G06F 3/0412 |
| | | | 345/175 |
| 2008/0313540 A1 | 12/2008 | Dirks et al. | |
| 2009/0167715 A1* | 7/2009 | Wang | G06F 3/016 |
| | | | 345/173 |
| 2009/0178011 A1 | 7/2009 | Ording et al. | |
| 2009/0241072 A1 | 9/2009 | Chaudhri et al. | |
| 2009/0315839 A1* | 12/2009 | Wilson | G06F 17/5009 |
| | | | 345/173 |
| 2010/0020035 A1* | 1/2010 | Ryu et al. | 345/173 |
| 2010/0023871 A1* | 1/2010 | Bederson | G06F 3/0486 |
| | | | 715/745 |
| 2010/0225596 A1* | 9/2010 | Eldering | G06F 3/016 |
| | | | 345/173 |
| 2010/0227640 A1 | 9/2010 | Kim et al. | |
| 2010/0306718 A1 | 12/2010 | Shim et al. | |
| 2011/0028186 A1* | 2/2011 | Lee et al. | 455/566 |
| 2011/0069019 A1* | 3/2011 | Carpendale | G06F 3/0425 |
| | | | 345/173 |
| 2011/0072400 A1 | 3/2011 | Watanabe et al. | |
| 2011/0130170 A1 | 6/2011 | Han et al. | |
| 2011/0187727 A1 | 8/2011 | Ahn et al. | |
| 2011/0238690 A1* | 9/2011 | Arrasvuori | G06F 3/04812 |
| | | | 707/769 |
| 2011/0256848 A1 | 10/2011 | Bok et al. | |
| 2011/0283241 A1* | 11/2011 | Miller et al. | 715/863 |
| 2012/0023425 A1 | 1/2012 | Hackborn et al. | |
| 2012/0189993 A1* | 7/2012 | Kindig | G09B 19/24 |
| | | | 434/234 |
| 2012/0212431 A1* | 8/2012 | Brinda | G06F 3/0488 |
| | | | 345/173 |
| 2012/0274662 A1* | 11/2012 | Kim | G06F 3/0488 |
| | | | 345/650 |
| 2012/0306632 A1* | 12/2012 | Fleizach | G06F 3/016 |
| | | | 340/407.2 |
| 2013/0007604 A1* | 1/2013 | John | G06F 3/0488 |
| | | | 715/255 |
| 2013/0219310 A1* | 8/2013 | Lee et al. | 715/764 |
| 2013/0314341 A1* | 11/2013 | Lee et al. | 345/173 |
| 2013/0335360 A1* | 12/2013 | Ron | G06F 3/041 |
| | | | 345/173 |
| 2014/0033142 A1* | 1/2014 | Ding | 715/867 |
| 2014/0129935 A1* | 5/2014 | Ovadia Nahon | G06F 3/01 |
| | | | 715/716 |

FOREIGN PATENT DOCUMENTS

| | | |
|---|---|---|
| EP | 2285077 A2 | 2/2011 |
| KR | 10-2008-0079333 A | 8/2008 |
| RU | 2 288 512 C2 | 5/2009 |
| WO | WO2011/134306 A1 * | 3/2011 |
| WO | 2011/090324 A2 | 7/2011 |

OTHER PUBLICATIONS

"Trying to locate live wallpaper that has water with ripples, leaves, branches". Question posed at Transformer Forums on Feb. 18, 2012. Retrieved from [http://www.transformerforums.com/forum/asus-transformer-tf101-accessories/15933-trying-locate-live-wallpaper-has-water-ripples-leaves-branches.html] on [Dec. 22, 2016]. 5 pages.*

Sieber, Tina. 11 Fascinating Android Live Wallpapers to Animate Your Home Screen. Article posted at Make Use of website on Sep. 15, 2011. Retrieved from [http://www.makeuseof.com/tag/11-fascinating-android-live-wallpapers-animate-home-screen/] on [Dec. 22, 2016]. 9 pages.*

Gunther, Cory. Koi Fish Live Wallpaper, 3D Graphics and Rain Drops Too. Article posted at Android Community website on Jul. 19, 2011 with screenshots from embedded YouTube video. Retrieved from [https://androidcommunity.com/koi-fish-live-wallpaper-3d-graphics-and-rain-drops-too-20110719] on [Dec. 22, 2016]. 14 pages.*

"Anyone know where to find the water live wallpaper with autumn leaves". Question posed at Android Central Forum on Feb. 23, 2011. Retrieved from [http://forums.androidcentral.com/wallpapers-ringtones-themes/62675-anyone-know-where-find-water-live-wallpaper-autumn-leaves.html] on [Dec. 22, 2016]. 17 pages.*

Guy, Romain. Live Wallpapers. Article posted at Android Developers Blog on Feb. 5, 2010. Retrieved from [https://android-developers.googleblog.com/2010/02/live-wallpapers.html] on [Dec. 22, 2016]. 2 pages.*

Example screenshots for Live Wallpaper (water). Retrieved from YouTube videos posted on Jan. 13, 2010 and Apr. 23, 2010 on [Dec. 22, 2016]. 7 pages.*

YouTube. "Water (Live Wallpaper)". 17 second video uploaded to YouTube by Junior Barcenas on Jan. 13, 2010. https://www.youtube.com/watch?v=AEsZXHS7J0I. Reviewed on [Dec. 22, 2016]. 1 page.*

YouTube. "Water.theme for Winterboard". 31 second video uploaded to YouTube by iDroid News Videos on Apr. 23, 2010. https://www.youtube.com/watch?v=I2vGXPO80Cc. Reviewed on [Dec. 22, 2016]. 1 page.*

YouTube. "Koi Live Wallpaper by Kittehface (reviewed on Android tablet & smartphone)" 7:29 minute video uploaded to YouTube by SmartKeitai on Jul. 18, 2011. https://www.youtube.com/watch?v=8TdhC-YZPuY. Reviewed on [Dec. 22, 2016]. 1 page.*

Chinese Search Report dated Dec. 28, 2016.
Russian Search Report dated Feb. 8, 2017.
Australian Search Report dated Apr. 19, 2017.
Russian Search Report dated Jun. 29, 2017.

* cited by examiner

FIG. 6A
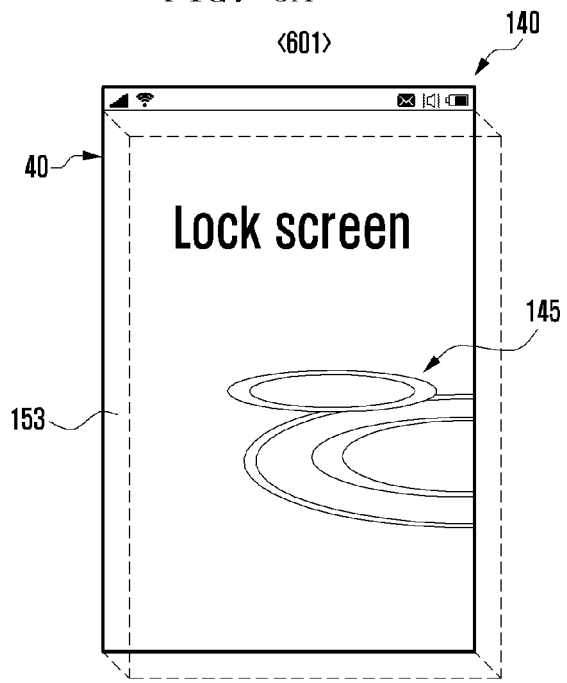
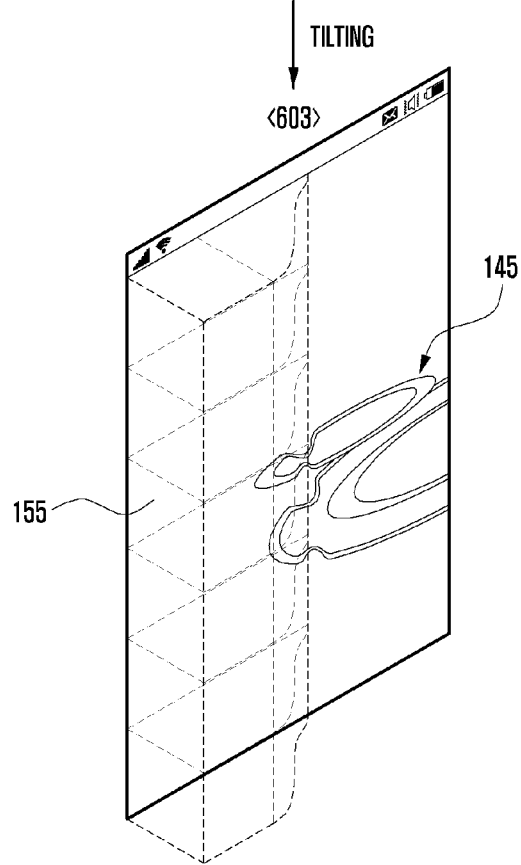

MOBILE TERMINAL HAVING A SCREEN OPERATION AND OPERATION METHOD THEREOF

CLAIM OF PRIORITY

This application claims the benefit under 35 U.S.C. §119 (a) from a Korean patent application filed on Feb. 24, 2012 in the Korean Intellectual Property Office and assigned Serial No. 10-2012-0019352, the entire disclosure of which is hereby incorporated by reference.

BACKGROUND OF THE INVENTION

Field of the Invention

The present invention relates to operation of a lock screen in a mobile terminal and, more particularly, to a screen operation that is intuitive and provides dynamic screen manipulations in a user friendly and interest arousing manner.

Description of the Related Art

Mobile terminals implemented with a touch panel are widely used because of convenience and portability thereof. When a touch event is generated by the touch panel, the mobile terminal performs a user function corresponding to the touch event. During operation, the touch panel cannot determine whether generation of a touch event is intended by the user or not. That is, a touch event that is not intended by the user may be generated according to placement of the mobile terminal or surroundings thereof. To overcome this problem, the mobile terminal supports a lock function so as to prevent unintended activation of the touch panel or user function. A lock screen may correspond to a protection layer that prevents unintended activation of a menu icon, widget icon or user function presented on the touchscreen.

Currently, the existing lock screen feature tends to have a simple configuration where a preset still or pattern image is output on the lock screen together with an item for unlocking the lock screen. However, as the same simple image or pattern is repeatedly displayed during operation, the user may be easily bored with the lock screen. Further, the user may also find the lock screen troublesome when entering a menu mode. Thus, there is a need for a new scheme in providing an improved screen.

SUMMARY OF THE INVENTION

The present invention has been made in view of the above problems a and provides a mobile terminal and its screen operation method that present an appealing, easy to use and user-friendly screen, thus enabling the user to invoke screen functions in a more adaptive and dynamic way.

In accordance with an exemplary embodiment of the present invention, a mobile terminal supporting lock screen operation includes: a touchscreen displaying at least one of an amorphous object that is changeable at least in part to a specific form according to an input event, and a concrete object that is generated from the amorphous object by modifying the amorphous object at least in part according to the input event; and a control unit controlling the touchscreen to output a lock screen containing the amorphous object and to display the concrete object on the lock screen according to an input event.

In accordance with another exemplary embodiment of the present invention, a lock screen operation method for a mobile terminal includes: displaying a lock screen containing an amorphous object that is changeable at least in part to a specific form according to an input event; receiving a generated input event; and displaying a concrete object that is generated from the amorphous object by modifying the amorphous object at least in part according to the input event.

Another aspect of the present invention provides a computer program comprising instructions arranged, when executed, to implement a method and/or apparatus, in accordance with any one of the above-described aspects. A further aspect provides machine-readable storage storing such a program.

Other aspects, advantages, and salient features of the invention will become apparent to those skilled in the art from the following detailed description, which, taken in conjunction with the annexed drawings, disclose exemplary embodiments of the invention.

BRIEF DESCRIPTION OF THE DRAWINGS

The features and advantages of the present invention will be more apparent from the following detailed description in conjunction with the accompanying drawings, in which:

FIGS. 6a and 6b illustrate lock screen manipulation causing an amorphous object to represent tilting in accordance with an exemplary embodiment of the present invention;

DETAILED DESCRIPTION OF EXEMPLARY EMBODIMENTS

Figure 1:
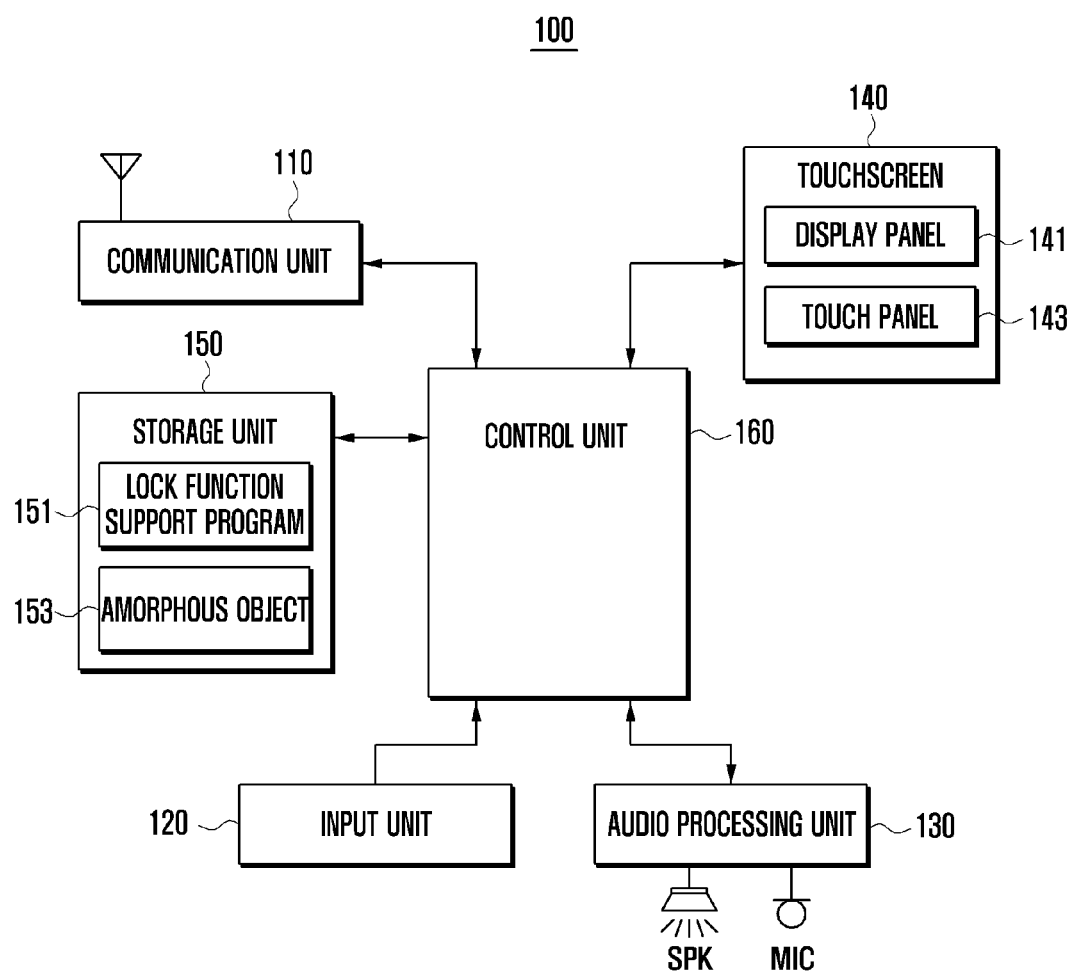
FIG. 1 is a block diagram of a mobile terminal supporting a lock screen operation according to an embodiment of the present invention.

Hereinafter, exemplary embodiments of the present invention are described in detail with reference to the accompanying drawings.

The following description is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the embodiments described herein can be made without departing from the scope of the invention.

The terms, words and expressions used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims.

For the purposes of clarity and simplicity, detailed descriptions of well-known functions and structures incorporated herein may be omitted to avoid obscuring the subject matter of the present invention. In the drawings, some elements are exaggerated or only outlined in brief, and thus may be not drawn to scale. The present invention is not limited by relative sizes of objects and intervals between objects in the drawings.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, it is to be understood that the singular forms "a," "an," and "the" include plural referents unless the context clearly dictates otherwise, and where the indefinite article is used, the specification is to be understood as contemplating plurality as well as singularity, unless the context requires otherwise. Thus, for example, reference to "an object" includes reference to one or more of such objects.

Features, integers, characteristics, compounds, chemical moieties or groups described in conjunction with a particular aspect, embodiment or example of the invention are to be understood to be applicable to any other aspect, embodiment or example described herein unless incompatible therewith. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

FIG. 1 is a block diagram of a mobile terminal 100 supporting a lock screen operation according to an embodiment of the present invention.

Referring to FIG. 1, the mobile terminal 100 may include a communication unit 110, an input unit 120, an audio processing unit 130, a touchscreen 140, a storage unit 150, and a control unit 160.

Briefly, the mobile terminal 100 having the above configuration provides a lock screen on the touchscreen 140, and outputs an amorphous object having no pre-specified shape with directivity and can be changed at least in part into a concrete object responsive to an input event, so as to allow dynamic user manipulation without restrictions. An amorphous object may comprise, for example, a graphical element having no symmetry (e.g. mirror, rotational and/or translational symmetry) and/or a graphical element comprising no sharp edges (e.g. the gradient image of the graphical element contains no pixel values greater than a certain threshold). Conversely, a concrete object may comprise, for example, an object having a pre-specified or definite shape, form, direction and/or directivity, for example a graphical element having a degree of symmetry and/or a graphical element comprising one or more sharp edges. Thus, the user according to the teachings of the present invention may generate various gesture events on the amorphous object displayed on the screen in a restriction-free and dynamic way, and where manipulation on the amorphous object may provide intuitive and dynamic feedback to the user for operation. In the embodiment, the amorphous object may not have a fixed shape such as a liquid (water), a gas (wind, fire, fog or vapor), or a solid (land composed of soil, sand and gravel) in an initial state, and then may exhibit a concrete shape visible to the user according to a user gesture applied thereon. As a result, the mobile terminal 100 supports non-directive unlocking of the lock screen with respect to a concrete object created based on the amorphous object. When the lock screen is unlocked, a previous screen that was used before display of the lock screen or a pre-scheduled screen may be output.

In operation, the mobile terminal 100 may output a lock screen in response to a preset event or expiration of a given time during execution of a user function. For example, the lock screen may be activated in response to a preset event or expiration of a given time during execution of a communication function. The lock screen may be output according to preset settings while web pages are being downloaded after connecting to a web server through the communication unit 110.

As shown in FIG. 1, the communication unit 110 supports communication functions of the mobile terminal 100, and may establish a communication channel to another mobile terminal or to a web server providing specific services through a communication network. When the mobile terminal 100 does not support communication, the communication unit 110 may be excluded. The communication unit 110 may include a mobile communication module supporting mobile communication. Thus, the communication unit 110 may establish a communication channel for a voice call, a data call and a video call to a mobile communication system, and send and receive signals through the communication channel.

The input unit 120 may generate various input signals needed for operation of the mobile terminal 100. The input unit 120 may include various input means such as a keyboard, keypad, and key button. The input unit 120 may also include a touch panel 143 and a touch map output on a display panel 141. The input unit 120 may generate an input signal for activating the lock screen, and generate an input signal for entering into a deep sleep state after the lock screen is activated. The input unit 120 may generate an input signal for invoking a shortcut menu according to user control while the lock screen is displayed.

The audio processing unit 130 includes a microphone MIC for collecting audio data and a speaker SPK for outputting various audio data, outputting audio data generated by a playback of audio files stored in the storage unit 150, and outputting audio data received externally. In particular, the audio processing unit 130 output various sound effects according to different manipulations of the lock screen. For example, the audio processing unit 130 may output a sound effect when a concrete object with a specific shape is generated from the amorphous object in response to an input event. Further, the output of a sound effect may be skipped according to user settings.

The touchscreen 140 output various screens related to usage of the mobile terminal 100, such as an idle screen and menu screen. The touchscreen 140 may include a display panel 141 and a touch panel 143. The touch panel 143 may be implemented using capacitance-based technology and generate a touch event corresponding to a capacitance change caused by an object like a finger. The display panel 141 may output various screens related to usage and user functions of the mobile terminal 100.

In particular, the display panel 141 outputs various windows related to lock screen manipulations. For example, the display panel 141 may output a window, defining a lock screen window, with an amorphous object without a fixed shape thereon. The display panel 114 may also output a window showing a concrete object generated in response to an input event made on the amorphous object, a window showing the unlocking of the lock screen in response to an input event or accumulation effect by the concrete objects being generated thereon, and a pre-scheduled window after unlocking the lock screen. Furthermore, the display panel 141 may output a window with an amorphous object without a fixed shape thereon in a certain screen such as the idle screen and the menu screen. The display panel 114 may also output a window showing a concrete object generated in response to an input event made on the amorphous object, a window showing in response to an input event or accumulation effect by the concrete objects being generated thereon in a certain screen such as the idle screen and the menu screen.

As described above, the touchscreen 140 may output a lock screen containing at least one amorphous object without a fixed shape, such as a liquid (water), a gas (wind, fire, fog or vapor), or a solid (land composed of soil, sand and gravel), and may generate a concrete object with a fixed shape from the amorphous object in response to an input event. In the embodiment, the touchscreen 140 may display the concrete object only for a short time. After expiration of a specified time or application of an input event, the concrete object may disappear and the amorphous object may be restored. Thus, the concrete object may be continuously changed from start of an application of the input event to end thereof. Output of an amorphous object, output of a concrete object, and restoration of the amorphous object explained above will be described in detail later with reference to the drawings.

The storage unit 150 may store an operating system as well as data and application programs for realizing user functions. In particular, the storage unit 150 may store a lock function support program 151 and an amorphous object 153 to realize lock screen features of the present invention.

The lock function support program 151 may include various routines to support lock screen features of the present invention. For example, the lock function support program 151 may include a routine for checking whether a lock setting condition is met, a routine for outputting a lock screen containing a preset amorphous object 153 on the touchscreen 140 when a lock setting condition is met, a routine for presenting a concrete object by changing the amorphous object 153 in response to an input event after activation of the mobile terminal 100 to unlock the lock screen, and a routine for unlocking the lock screen when an input event or the concrete object satisfies a preset condition. To support lock screen features of the present invention, the lock function support program 151 may be loaded on the control unit 160 to perform data processing, object handling, sound effect output, and lock screen activation and unlocking.

The amorphous object 153 is an object constituting a lock screen. The amorphous object 153 may be represented on the lock screen in various forms, such as water of a given volume, wind of a given volume, or land of a given thickness. The amorphous object 153 may be changed into a concrete object with a fixed shape for a short time period by the lock function support program 151 responding to an input event, and may be restored to the original state after a specified duration. That is, an area where the input event is detected can be shown to be responsive to the input event in various forms. For example, the concrete object can be displayed in a form of a splash, ripples, waveform, or stroke on the water, or any combination thereof, when a user's finger touches the surface of screen displaying an amorphous object like water.

The control unit 160 controls signal flows, information collection, and output operations to support lock screen features of the present invention.

Figure 2:
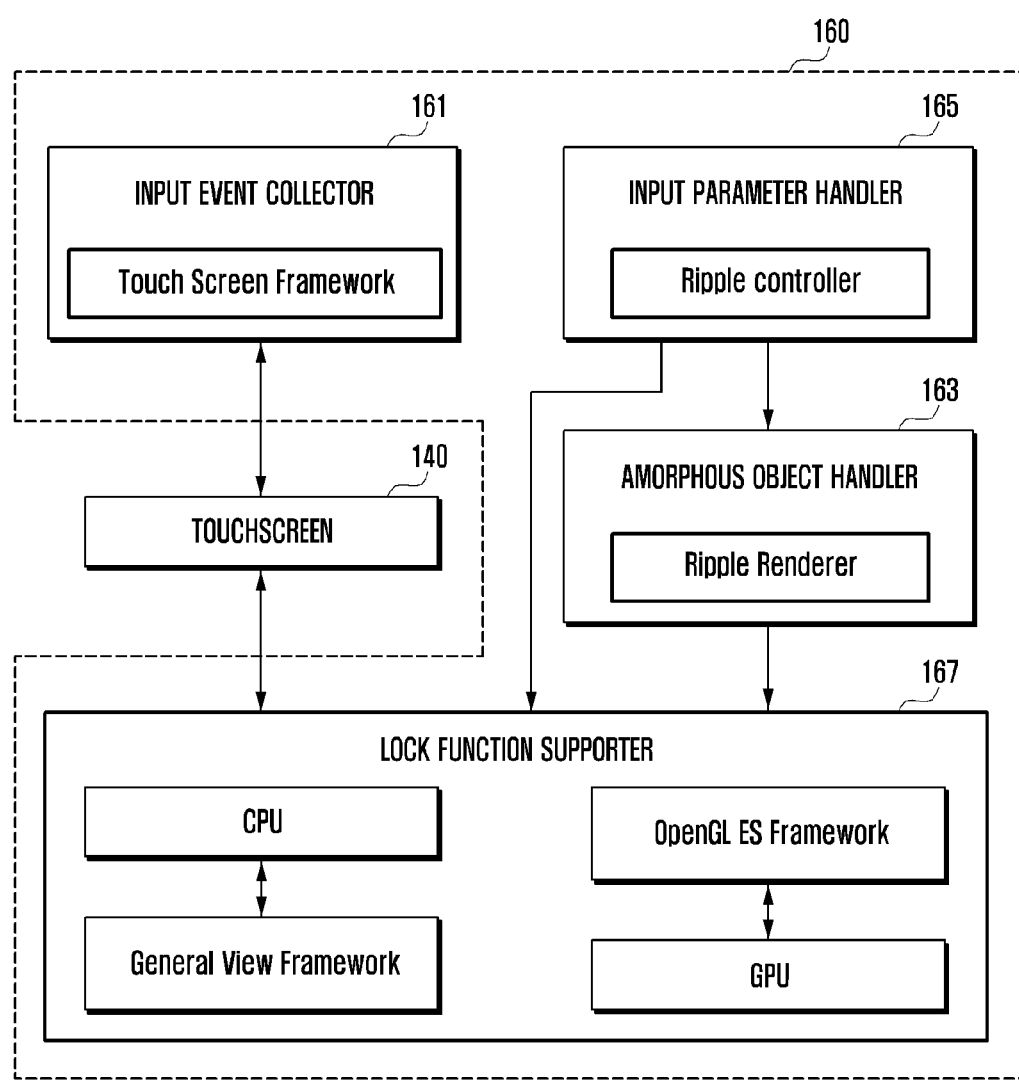
FIG. 2 illustrates a configuration of a control unit of the mobile terminal.

FIG. 2 illustrates a configuration of the control unit 160 of the mobile terminal 100.

Referring to FIG. 2, the control unit 160 may include an input event collector 161, an amorphous object handler 163, an input parameter handler 165, and a lock function supporter 167. To provide a fast and natural lock screen, the control unit 160 may produce ripple propagation effect using a GPU (graphics processing unit) accelerated framework such as OpenGL Framework.

The input event collector 161 collects input events to generate a concrete object from the amorphous object 153. For example, the input event collector 161 may recognize a touch gesture occurring on the touch panel 143 as an input event. Also, the input event collector 161 may recognize shaking of the mobile terminal 100 as an input event. Further, the input event collector 161 may recognize tilting of the mobile terminal 100 as an input event. To enable the input event collector 161 to recognize shaking or tilting as an input event, the mobile terminal 100 may further include a sensing unit (not shown) including, for example, an acceleration sensor, gyro sensor, geomagnetic sensor and pressure sensor. When a touch event is collected while the amorphous object 153 is output on the touchscreen 140, the input event collector 161 may forward the touch event to the amorphous object handler 163 and input parameter handler 165. In particular, the input event collector 161 provides a touchscreen framework to support touchscreen operations, and may forward a collected touch event to the amorphous object handler 163.

The amorphous object handler 163 may change the amorphous object on the lock screen into a concrete object with a specific shape in the area where the input event occurs. The amorphous object handler 163 may exhibit the concrete object only for a short time while the lock screen is displayed and notify the same to the lock function supporter 167. The amorphous object handler 163 may include a ripple renderer. The ripple renderer receives an indication as to whether a unit ripple creation condition is satisfied from a ripple controller of the input parameter handler 165, generates a corresponding unit ripple waveform, and sends the unit ripple waveform to the lock function supporter 167. A unit ripple waveform may comprise for example a waveform representing a single ripple (e.g. series of concentric rings propagating from a single point formed when a stone is dropped into water).

The input parameter handler 165 may represent input events and status of the concrete object generated from the amorphous object as parameter values to check whether a ripple creation condition or a lock release condition is satisfied. For example, the input parameter handler 165 may represent elements of the amorphous object, which are turned into a concrete object in response to input events, as a "force" parameter, and examine whether the accumulated value of the force parameter is greater than a preset threshold or satisfies the lock release condition.

For example, assume that the amorphous object is water; a concrete object can be displayed as ripples in the form of concentric circles or waves propagating in a direction as it would be happened in real world. That is, the amorphous object composed of water is gradually changed into the concrete object of ripples in response to a touch event (input event). The input parameter handler 165 may represent the occurrence of a touch event as a parameter and check whether the parameter value is greater than or equal to a preset threshold. When the parameter value is greater than or equal to the threshold, the input parameter handler 165 may send the parameter value to the amorphous object handler 163, which may then generate ripples. In addition, the input parameter handler 165 may check the accumulated parameter value satisfies the lock release condition and, when the accumulated parameter value satisfies the lock release condition, notify this to the lock function supporter 167. That is, the amount of ripple effect on the screen is detected and assigned a particular value depending on the degree of ripple effect responsive to the input event. To this end, the input parameter handler 165 may include a ripple controller. In the case of water as the amorphous object, the ripple controller receives a touch change value from the touchscreen framework (i.e., the amount of ripple effect detected on the screen) and converts the touch change value into a ripple wavelength value through CPU operation. The ripple controller may check whether the ripple wavelength value is sufficient for a unit ripple waveform, and send the checked result to the amorphous object handler 163. The ripple controller may also check whether the ripple wavelength value satisfies the lock release condition, and send the checked result to the lock function supporter 167.

Using the above value, when the input parameter handler 165 notifies that an accumulated parameter value is greater than a preset threshold, the lock function supporter 167 may unlock the lock screen. Hence, the lock function supporter 167 may perform lock screen unlocking according to accumulation of parameter values without use of a specific pattern. Further, the lock function supporter 167 may check whether the mobile terminal 100 satisfies a lock setting condition, and activate the lock screen to lock the touchscreen 140 when the lock setting condition is satisfied. For example, when no input is generated for a given time from the input unit 120, the lock function supporter 167 may activate the lock screen. The lock function supporter 167 may activate the lock screen in response to a user request.

In alternate embodiment, gradual display of a shortcut menu region or specific menu region in response to invocation thereof while the lock screen is output may be interpreted as an input event. The lock function supporter 167 may modify the concrete object according to output of a region caused by an input event. Here, the lock function supporter 167 may use GPU operation to process propagation of a unit ripple waveform received from the amorphous object handler 163. That is, when a unit ripple waveform is received from the amorphous object handler 163, the lock function supporter 167 generates propagation effects of the unit ripple waveform using GPU acceleration and presents the propagation effects on the touchscreen 140 through OpenGL ES Framework. Propagation of the unit ripple waveform may be represented as ripples in the form of concentric circles propagating from the center to the outside with dwindling heights. The lock function supporter 167 may use CPU operation and General View Framework to display, move or arrange other regions or fields, such as a time information field and weather information field, on the lock screen.

To support natural waveform processing, among elements of the lock screen, the control unit 160 may use CPU operation to process ordinary fields such as the time information field and weather information field, and may use GPU operation to process the concrete object such as a waveform.

The lock function supporter 167 may display the concrete object such as ripples for a given time and restore the original amorphous object after the given time or upon unlocking of the lock screen. The lock function supporter 167 may also display a concrete object modified by an input event for a longer period according to user settings. When an input event occurs at the modified concrete object, the lock function supporter 167 may further modify the concrete object.

For example, when the amorphous object is a liquid like water or a gas like wind, the lock function supporter 167 may change the amorphous object into a concrete object and restore the amorphous object after a given time according to input events. When the amorphous object is a solid (like land composed of sand and soil or glass window), the lock function supporter 167 may mark a concrete object like scratch, crack or crater on the solid in the area where an input event occurs. The amorphous object handler 163 may provide unit elements for object modification to the lock function supporter 167, which may then perform concrete object modification by diffusing, extending, rearranging or proliferating the unit elements. Here, input events may correspond to touch gestures such as tap, drag, flick, sweep occurring on the lock screen containing an amorphous object, or to shaking, tilting or tapping of the mobile terminal 100. Application of accumulated parameter values to unlocking of the lock screen is described in detail later with reference to the drawings.

Figure 3:
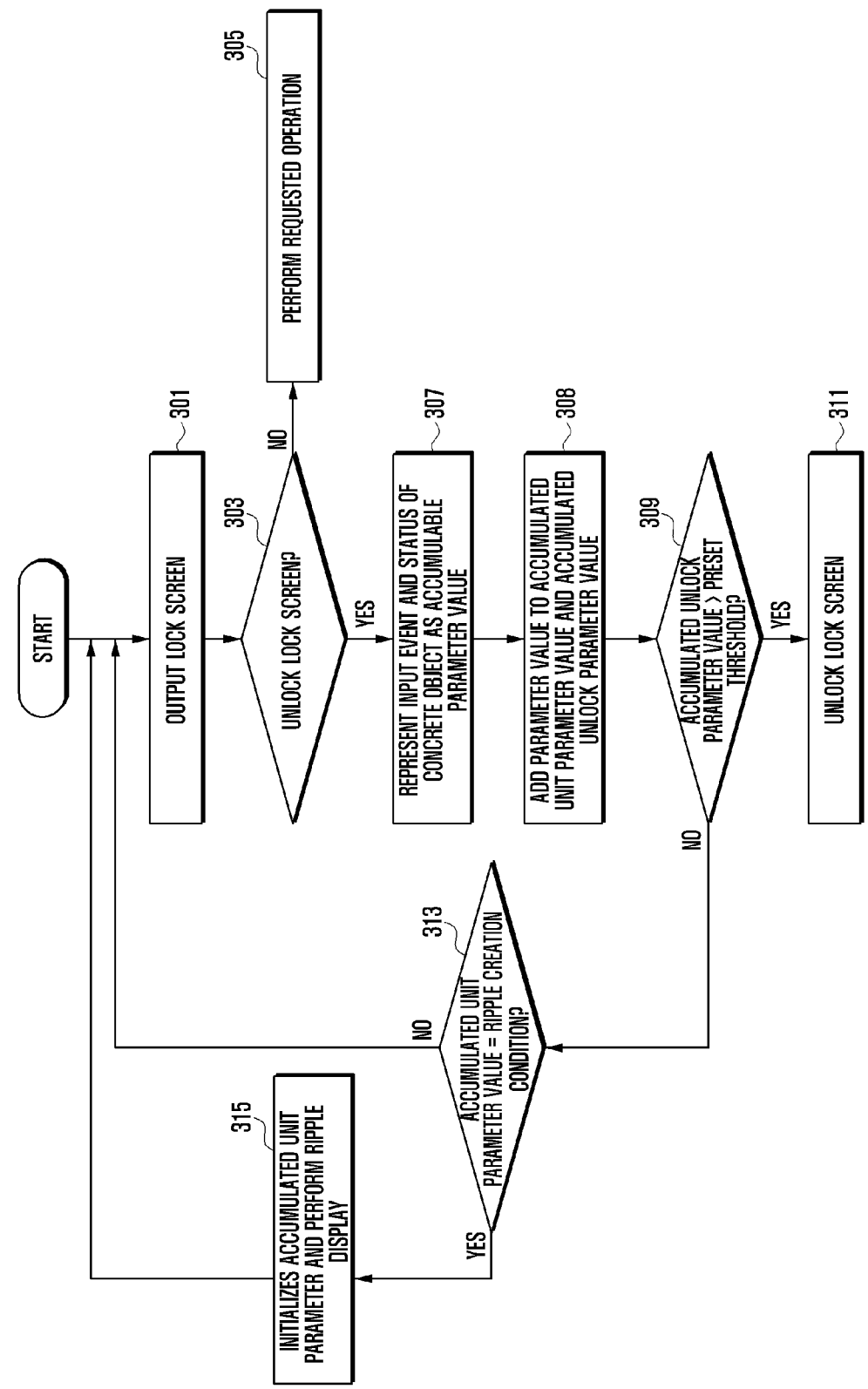
FIG. 3 is a flowchart of a lock screen operation method according to another embodiment of the present invention.

FIG. 3 is a flowchart of a lock screen operation method according to another embodiment of the present invention.

Referring to FIG. 3, in the lock screen operation method, the control unit 160 of the mobile terminal 100 outputs a lock screen on the touchscreen 140 (301). As described before, the lock screen may contain an amorphous object. The lock screen containing an amorphous object may further include information regions for various user functions. For example, the lock screen may include at least one of a time information region to output the current time, a weather information region to output today's weather forecast, a ticker region to output news highlight, a shortcut menu region for shortcut menu operation, and an information item region to output received system information. The lock screen may further include a mini player region corresponding to a player for audio file playback according to user selection.

After the lock screen is output, the user may generate an input signal (or input event) to unlock the lock screen.

Hence, the control unit 160 checks whether an input event corresponds to a request for unlocking the lock screen (303). When the input event does not correspond to a request for unlocking the lock screen, the control unit 160 may perform a user function corresponding to the input event (305). For example, the control unit 160 may fully activate the touchscreen 140. The control unit 160 may invoke a requested user function operable without unlocking the lock screen, such as placement of an emergency call.

When the input event corresponds to a request for unlocking the lock screen, the control unit 160 represents at least one of the input event and status of the concrete object created by the input event from the amorphous object as accumulable parameter values (307). For example, when the input event corresponds to a touch and drag gesture, the control unit 160 may represent at least one of movement distance, movement speed, direction change and direction change angle of the touch and drag gesture as accumulable parameter values. The control unit 160 may represent the concrete object created by an input event as an accumulable parameter value. The control unit 160 may also represent both the input event and the concrete object as accumulable parameter values.

The control unit 160 adds the obtained parameter value to the current accumulated unit parameter value and the current accumulated unlock parameter value to produce a new accumulated unit parameter value and new accumulated unlock parameter value (380). The control unit 160 checks whether the new accumulated unlock parameter value is greater than or equal to a preset threshold (309). That is, the control unit 160 examines whether at least one of accumulated movement distance of touch and drag, accumulated direction change counts or accumulated direction change angles of touch and drag, and accumulated number of concrete objects is greater than or equal to a corresponding preset threshold. The accumulated number of concrete objects may be measured on the basis of the number of created concrete object elements or the ratio of overlapping concrete object elements.

When the new accumulated unlock parameter value is greater than or equal to the preset threshold, the control unit 160 unlocks the lock screen (311). That is, the control unit 160 may remove the lock screen from the touchscreen 140 and restore the original screen output before display of the lock screen.

When the new accumulated unlock parameter value is less than the preset threshold, the control unit 160 checks whether the new accumulated unit parameter value corresponds to a ripple creation condition (313). When the new accumulated unit parameter value corresponds to the ripple creation condition, the control unit 160 initializes the accumulated unit parameter and controls ripple display (315). When the new accumulated unit parameter value does not correspond to the ripple creation condition, the control unit 160 returns to step 301 and repeats the procedure.

In the case of a touch event, when a touch and move gesture is detected, the control unit 160 may convert the touch movement value into a ripple waveform value, and adds the ripple waveform value to the unit parameter value for ripple creation and to the unlock parameter value for unlocking. When the accumulated parameter values satisfy corresponding preset conditions, the control unit 160 may perform ripple generation and unlocking of the lock screen. Here, when the accumulated unit parameter value satisfies the ripple creation condition, the control unit 160 initializes the accumulated unit parameter and performs ripple generation. Such ripple generation may be repeated several times before the touch release.

As described above, the lock screen operation method of the present invention enables the mobile terminal to provide an amorphous object on the lock screen, and a portion of the amorphous object may be turned into concrete objects in response to input events generated by the user. Hence, the user interface may be changed from a static state to a dynamic state through object modification in response to occurrence of an input event. As a result, the present invention enables the user to perform lock screen operation in a more appealing, entertaining, and user-friendly way.

Hereinabove, the lock screen operation according to the present invention are described by providing screen interface operations on the touchscreen in detail with reference to the drawings.

Figure 4:
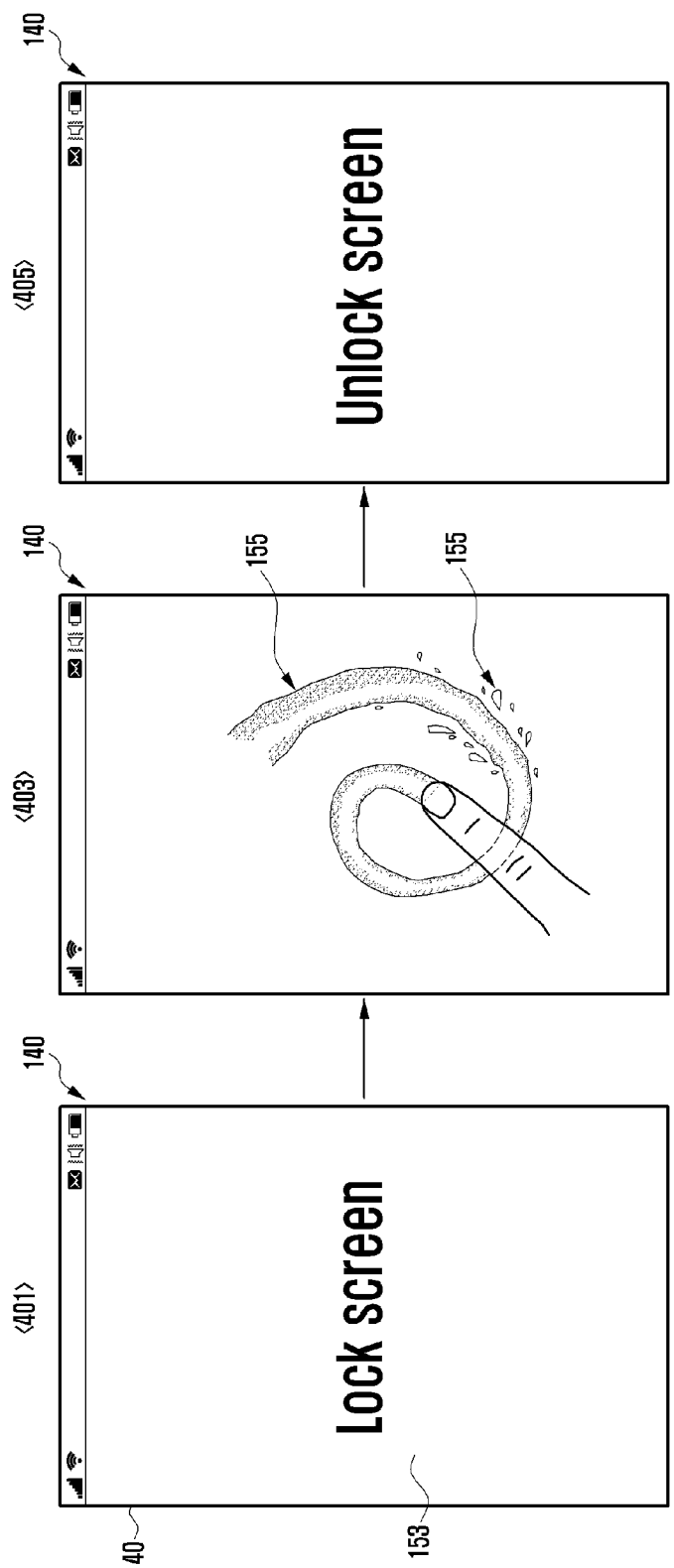
FIG. 4 illustrates lock screen manipulation causing a portion of an amorphous object to be turned into a cutwater shape.

FIG. 4 is screen representations illustrating lock screen manipulation according to a first embodiment of the present invention.

Referring to FIG. 4, when a preset condition is satisfied or occurs in the mobile terminal 100, the control unit 160 may output a lock screen 40 on the touchscreen 140 as shown by screen 401. Here, the lock screen 40 may contain or display an amorphous object 153. For illustrative purpose, the amorphous object 153 here is assumed to be water. However, the amorphous object is not limited to water, and any object without a fixed shape may be used as an amorphous object of the present invention.

When the user generates an input event while the lock screen 40 is output, a concrete object 155 corresponding to the detected input motion may be generated from the amorphous object 153 as shown by screen 403. Here, the concrete object 155 is a cutwater image drawn according to a touch and drag gesture. That is, the concrete object 155 may be viewed as the portion of the amorphous object 153 that is changed or reacted in response to an input event as it would in a real environment setting.

The concrete object 155 may further include water splashes. To be more specific, when the movement speed of a touch and drag gesture is below a threshold value, the control unit 160 may control the concrete object 155 to show a first image of relatively still water (e.g. cutwater image), and when the movement speed of the touch and drag gesture is greater than or equal to the threshold value, the control unit 160 may control the concrete object 155 to show a second image of relatively turbulent water (e.g. an image of cutwater and splashes in a certain direction). As shown, splashes may take a form of water spray.

Again, water is used as the amorphous object 153 and the concrete object 155 is depicted using water-splitting and water splashes. However, the present invention is not limited thereto. For example, land covered with soil having a specific thickness may be used as the amorphous object 153, and the concrete object 155 may be depicted using soil-splitting and soil splashes along the detected input event. Alternatively, a gas having a specific density such as vapor or fog may be use as the amorphous object 153, and the concrete object 155 then may be depicted using gas-splitting and gas eddies in response to the detected input event.

While the concrete object 155 responsive to the input event is generated from the amorphous object 153, the control unit 160 may check whether status of the concrete object 155 on the touch screen has reached a preset threshold or condition. This status checking may be performed based on at least one of regional density differences due to water-splitting, regions where density differences are present, length or area of water-splitting, presence of water spray, and amount of water spray. That is, a level or degree of concrete object effects on the screen is determined to decide whether to unlock the screen or not. For example, a detection of specified amount ripple effect responsive to the input event is used to unlock the screen. Thus, a minimum ripple effect detected on the touch screen would not trigger the controller to unlock the screen. Thus, when status of the concrete object 155 has reached the preset threshold or condition, the control unit 160 may perform unlocking and output an unlock screen as shown by screen 405. To identify current status of the concrete object 155, the mobile terminal 100 may store preset threshold ratios or values for comparison. Note that these threshold ratios or values may be selectively adjusted by the designer or the user.

As described above, the lock screen operation method of the present invention may use water as the amorphous object 153 and generate a concrete object 155 from the amorphous object 153 through cutwater animation in response to an input event, thereby producing dynamic screen changes based on the detected level of animation.

Figure 5:
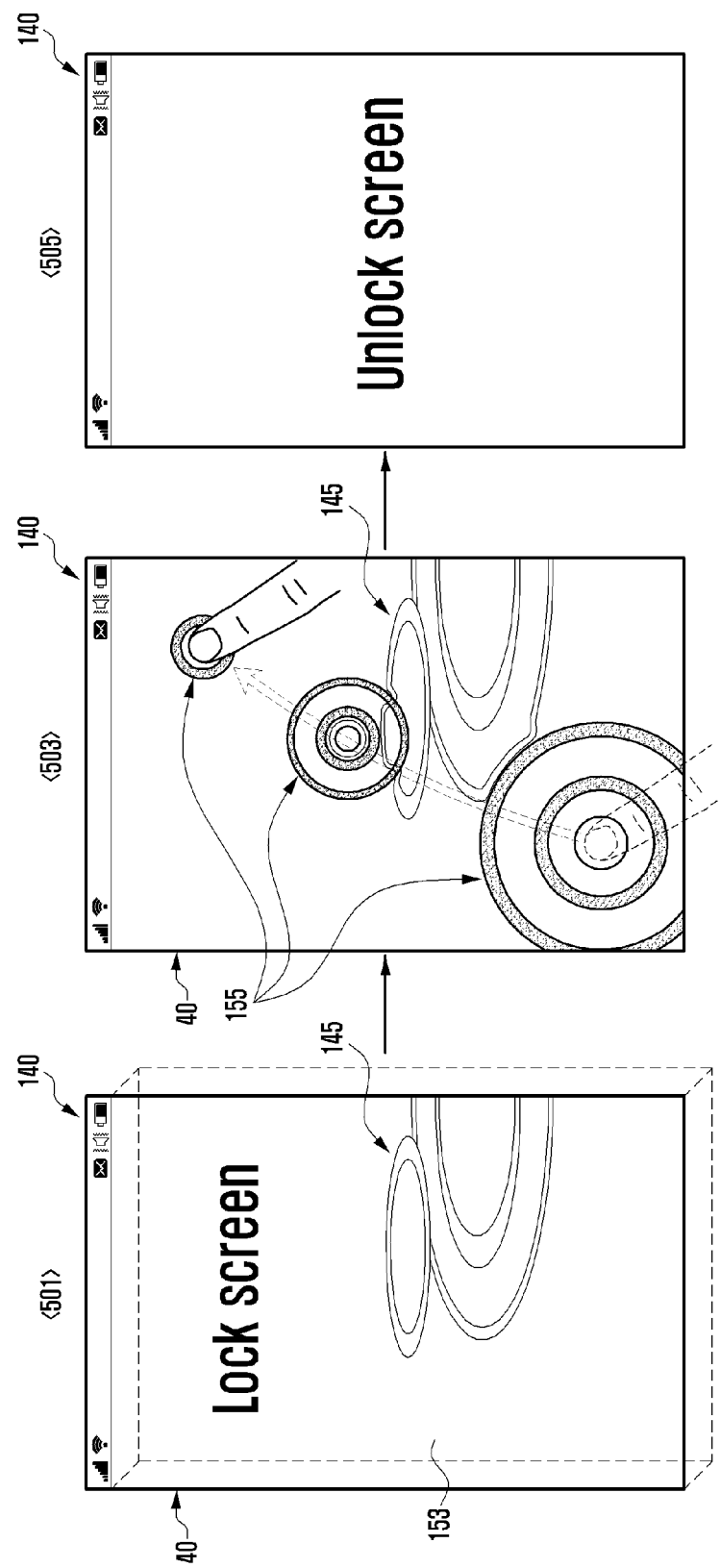
FIG. 5 illustrates lock screen manipulation causing portions of an amorphous object to be turned into stone skipping ripples in accordance with an exemplary embodiment of the present invention.

FIG. 5 illustrates another lock screen manipulation exhibiting concentric circles in propagation in accordance with an embodiment of the present invention.

Referring to FIG. 5, when a preset condition is satisfied by the mobile terminal 100, the control unit 160 may output a lock screen 40 on the touchscreen 140 as shown by screen 501. Here, the lock screen 40 may contain an amorphous object 153, such as water.

When the user generates an input event while the lock screen 40 is output on the touchscreen 140, a concrete object 155 responsive to the input event may be generated from the amorphous object 153 as shown by screen 503. For example, the concrete object 155 may be concentric circles centered at a position where the input event has occurred. Here, the input event may be composed of touch down for contact with the touch panel and touch release for detachment from the touch panel. Touch down event on the amorphous object 153 may generate a set of ripples as a concrete object 155, which may disappear after a while. Further, a touch release event (i.e., a finger detachment from the touch panel) from the amorphous object 153 may generate another set of ripples as a concrete object 155. As a result, when the user makes a tap gesture on the touch panel in sequence, a number of sets of ripples corresponding to each tap may be generated. Here, a set of ripples may be represented by little circular waves propagating from the touch point. Alternatively, the user can tap on the screen first and then perform a drag operation as shown in screen 503 which in turn will cause a number of ripple effects (i.e., similar to a stone skipping ripples as if a stone is thrown along the water surface) along the path of a touch and drag operation.

The lock screen 40 may further include a base layer 145 supporting the amorphous object 153. The base layer 145 may have a specific pattern, such as waveform earth quake type, etc., so as to clearly show the portion of the amorphous object changed into a concrete object. The pattern may be varied so as to represent the refraction of light due to propagation of circular ripples. Also, the pattern may be not used according to designer or user settings. Further, the base layer 145 can be displayed with other images, such as a wall paper image or any arbitrary image.

To unlock the lock screen 40, the user may generate a number of sets of ripples via a gesture on the screen. In this case, the user may apply a touch and move gesture involving drag, flick or sweep a distance on the touch screen. Then, as shown by screen 503, the control unit 160 may generate sets of circular ripples at regular intervals along the path of drag as concrete objects 155. Here, the number of sets of circular ripples may be varied according to hardware characteristics such as touchscreen size, aspect ratio and processing speed or to designer or user settings. That is, for the same movement distance, the number of sets of ripples as a concrete object 155 may be adjusted differently considering the size of touch display. When sets of circular ripples are generated along the path of a touch and move gesture such as a drag, flick, sweep, etc., the number of sets thereof (or generation locations) may be adjusted according to movement speed of the touch and move gesture.

When a number of ripples are generated, the control unit 160 may represent the number of ripples, the number of overlapping ripples or ratio of overlapping ripples as a parameter value, and check whether the detected parameter value is greater than or equal to a preset threshold. Here, the parameter value may be accumulated for a given time or the total number of generated ripples. When the accumulated parameter value is greater than or equal to the preset threshold, the control unit 160 may perform unlocking and output an unlock screen as shown by screen 505.

Figure 6B:
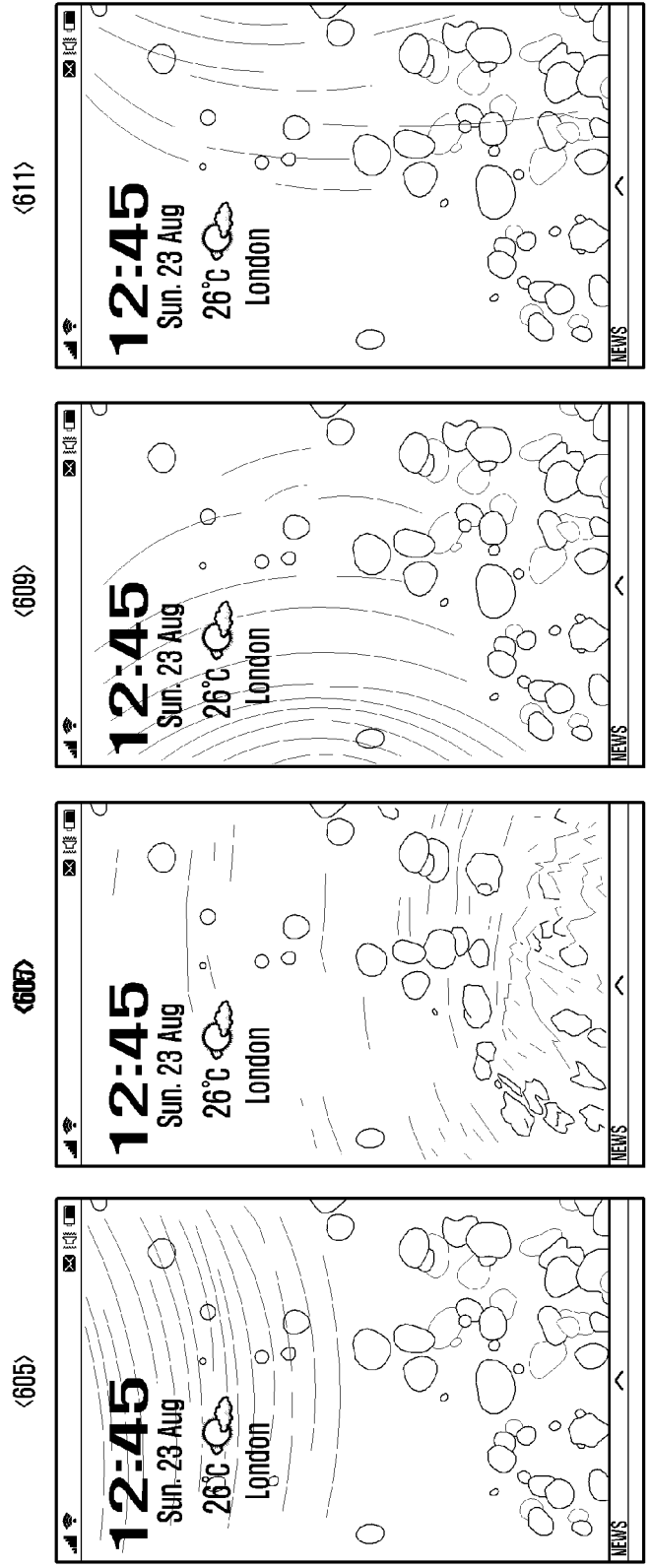

FIG. 6a and FIG. 6b illustrate another lock screen manipulation causing an amorphous object to represent tilting effect in accordance with an embodiment of the present invention.

Referring to FIG. 6a, according to lock screen activation, the control unit 160 may output a lock screen 40, which contains an amorphous object 153 such as water and a base layer 145 supporting the amorphous object 153 on the touchscreen 140, as shown by screen 601.

The user may tilt the mobile terminal 100 to the left from a front view as shown by screen 603. Then, as water leans in that direction, the amorphous object 153 is turned into a concrete object 155 depicting a form of the deflection corresponding to the tilt amount. That is, the concrete object 155 is generated by differences in volume and density among portions of water, causing a variation in light transmission which in turn causes a magnified appearance at a portion of the base layer 145. Hence, the pattern of the base layer 145 is changed at the deflected portion of the concrete object 155. For example, the base layer 145 may be bended at the deflected portion of the concrete object 155. Display of a region on the touchscreen 140 where water is leaned to left may be differently displayed from other regions. For example, information output on the concrete object 155 (the region where water is leaned) may be displayed in a larger size. That is, information output on the concrete object 155 may be displayed in a magnified form due to tilting since the thickness of water volume changed.

It should be noted that the teachings of the present invention are applicable to when the mobile terminal 100 is tilted to the right, upwards, downwards or diagonally. When the mobile terminal 100 is tilted to a particular direction, the control unit 160 may control display of the concrete object according to changes of density or arrangement in the amorphous object due to leaning toward the direction.

In alternate embodiment, as shown by screens 605 to 611 of FIG. 6b, ripple wavelengths may be represented differently according to variations and direction of tilting of the mobile terminal 100. For example, the ripple effect shown by the ripple lines occurs at the top in screen 605, bottom in screen 607, left in screen 609 and right in screen 611 according to the direction of the tilting.

Referring back to FIG. 6a, when the mobile terminal 100 is tilted for a specific duration, the control unit 160 may perform unlocking and output an unlock screen. For example, when the water is leaned upwards for a predetermined duration or more, the control unit 160 may unlock the lock screen 40. Alternatively, the control unit 160 may also unlock the lock screen 40 when the water is leaned according to a specific pattern (for example, leaned upwards and then downwards).

Figure 7:
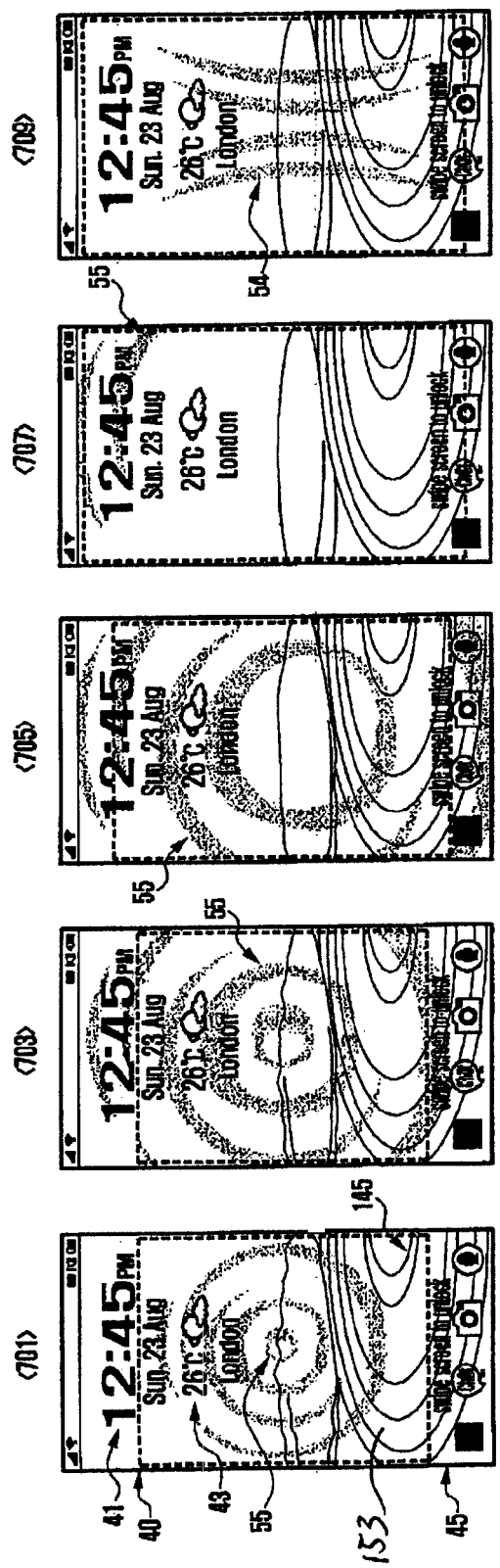
FIG. 7 illustrates lock screen manipulation causing an amorphous object to represent concentric circles in diffusion in accordance with an exemplary embodiment of the present invention.

FIG. 7 illustrates another lock screen manipulation causing ripple generation in accordance with an embodiment of the present invention in which the amorphous object is water, and the concrete object is ripples or wave patterns.

Referring to FIG. 7, when the lock screen 40 is activated or an input event is generated at the center of the lock screen 40, the control unit 160 may generate ripples 55 at the center of the touchscreen 140 as shown by screen 701. That is, the control unit 160 may generate ripples 55 once to indicate display of the lock screen 40 on the touchscreen 140 or upon generation of an input event by the user manipulating the mobile terminal 100. The size and amount of the ripple effect would be proportional to the tap impact on the touch screen. For example, a lighter and a shorter tap on the screen would generate a smaller ripple effect, whereas a longer and a firmer tap on the screen would generate a larger ripple effect. Here, the lock screen 40 may contain an amorphous object being water of a given volume and a base layer 145 supporting the amorphous object. Further, the lock screen 40 may include various information regions. For example, the lock screen 40 may include a time information region 41 to output the current time, a weather information region 43 to output today's weather forecast, and a shortcut menu region for shortcut menu operation.

The ripples 55 are in the form of circular waves propagating from the center to the outside in response to an input event, for example, a tap at the center of the screen. The wave height is greatest near the center, and the circular waves propagate with up and down motion. Portions of the circular waves with down motion are displayed relatively dark, and portions with up motion are displayed relatively light. As the ripples 55 gradually propagate, they may extend across the entire screen as shown by screen 703. As shown, the base layer 145 is distorted after generation of the ripples 55, and distortion of the base layer 145 is varied according to propagation of the ripples 55.

Thereafter, the ripples 55 may die out near the center as shown by screen 705. As the ripples 55 die out gradually, the amorphous object is restored as shown by screen 707.

Meanwhile, when circular waves of the ripples 55 reach the boundary of the touchscreen 140, they may be turned into reversed ripples 54 as shown by screen 709. The reversed ripples 54 may appear from screen 705. Waves of the reversed ripples 54 may be superposed with those of the ripples 55. In screen 709, waves of the reversed ripples 54 bounced off two sides of the touchscreen 140 move in the opposite directions.

After generation of the ripples 55, the control unit 160 may represent the number of circular waves, ratio of overlapping circular waves, or degree of superposition with reversed ripples as a parameter value, and unlock the lock screen 40 when the parameter value is greater than or equal to a preset threshold.

Figure 8:
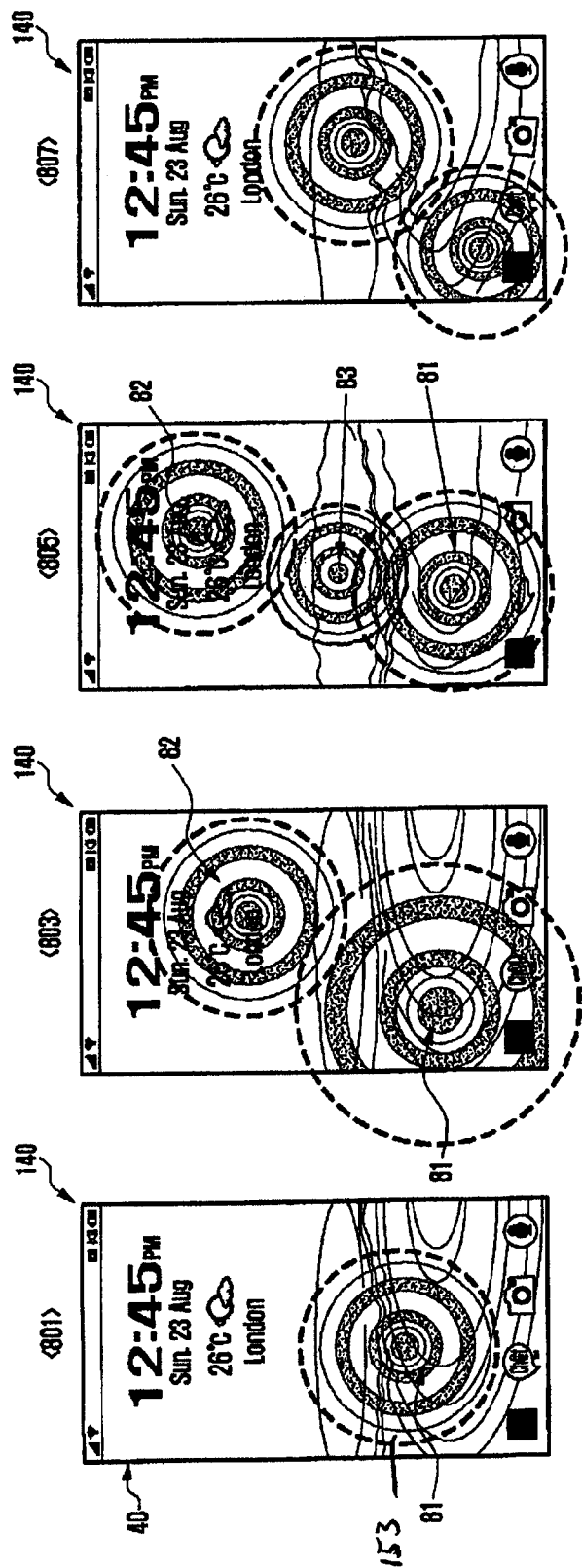
FIG. 8 illustrates lock screen manipulation causing an amorphous object to represent groups of concentric circles in diffusion in accordance with an exemplary embodiment of the present invention.

FIG. 8 illustrates lock screen manipulation causing generation of multiple sets of ripples in accordance with an embodiment of the present invention.

Referring to FIG. 8, according to lock screen activation, the control unit 160 may output a lock screen 40, which contains an amorphous object being water of a given volume, on the touchscreen 140. When an input event such as a touch gesture on the touchscreen 140 or movement of the mobile terminal 100, such as shaking, tilting, or throwing gesture with the terminal, is detected, the control unit 160 may generate first ripples 81 (corresponding to a concrete object created from water acting as the amorphous object) as shown by screen 801. The first ripples 81 are in the form of circular waves propagating from its center to the outside with changing wave heights as shown by screen 803. For a touch event, ripple generation may be performed once for touch down and for touch release. Hence, when the user makes a tap gesture on the touchscreen 140 in sequence, multiple sets of ripples may be generated at the same position. In screen 803, second ripples 82 are generated at a different position according to an input event.

When another input event occurs on the lock screen 40, third ripples 83 may be generated as shown by screen 805. Here, as the first ripples 81, the second ripples 82, and the third ripples 83 have been generated in the order named, their sizes may be different. When ripple waves overlap, they may interfere constructively or destructively as shown by screen 807. Thereafter, when no more input event occurs, the ripples gradually die out and the amorphous object is recovered.

After generation and cancellation of the ripples, the control unit 160 may represent the number of circular waves, ratio of overlapping circular waves, or degree of superposition with reversed ripples as a parameter value, and unlock the lock screen 40 when the parameter value is greater than or equal to a preset threshold.

Figure 9:
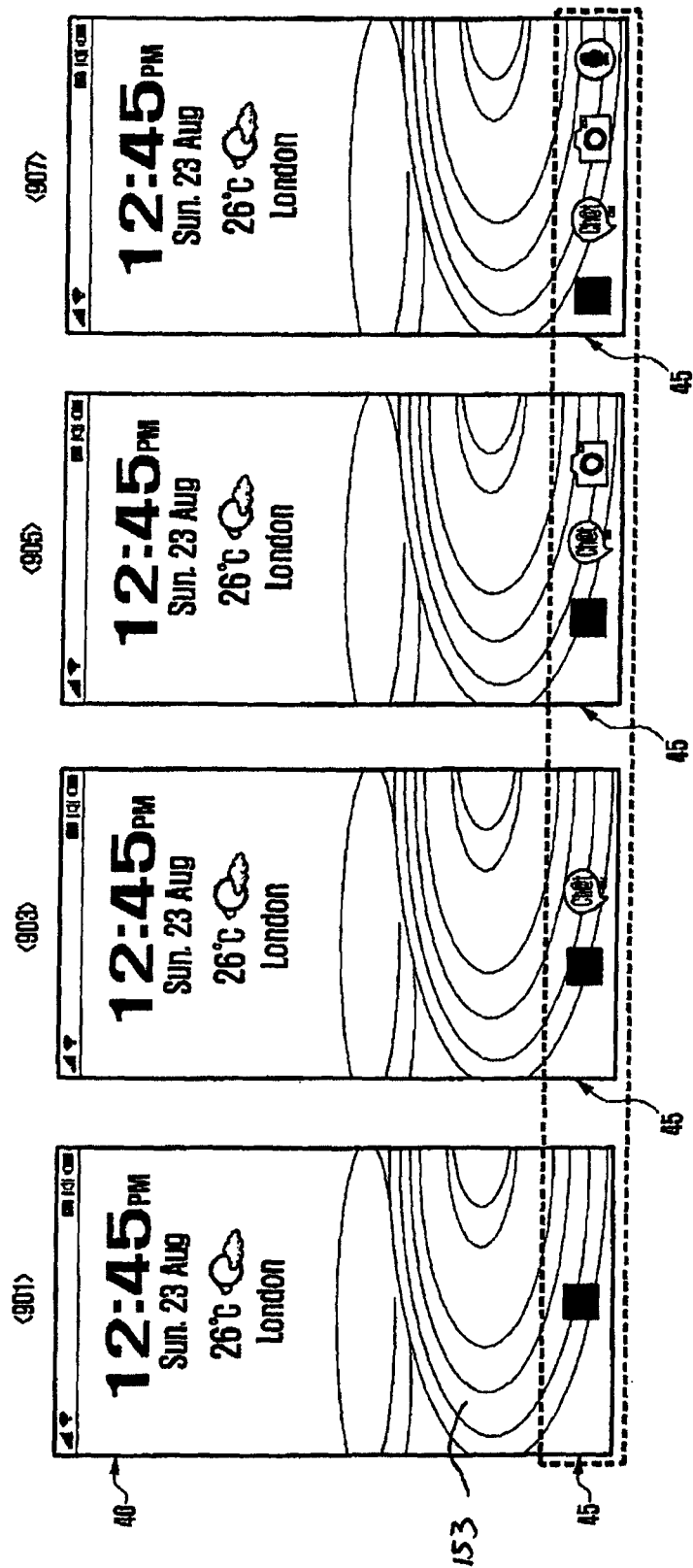
FIG. 9 illustrates lock screen manipulation for displaying a shortcut menu region in accordance with an exemplary embodiment of the present invention.
Figure 10:
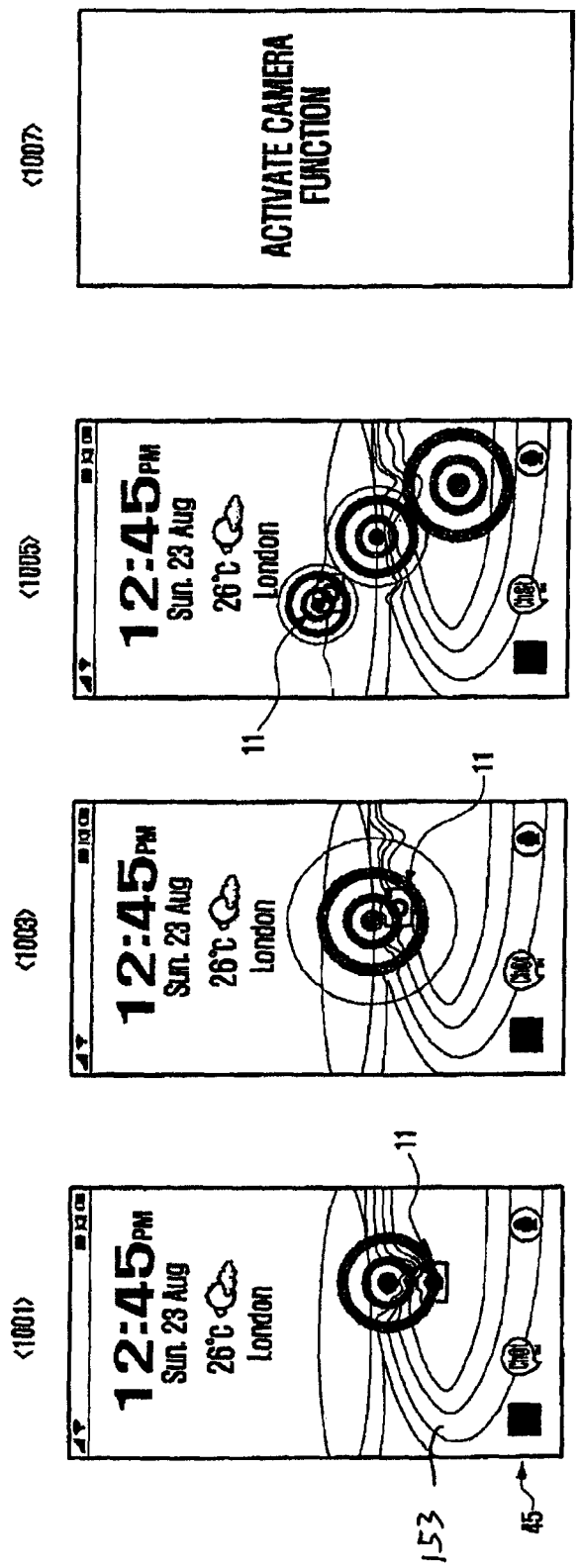
FIG. 10 illustrates lock screen manipulation for utilizing a shortcut menu region in accordance with an exemplary embodiment of the present invention.

FIG. 9 illustrates lock screen manipulation for displaying a shortcut menu region in accordance with an embodiment of the present invention, and FIG. 10 illustrates lock screen manipulation for utilizing the shortcut menu region in accordance with an embodiment of the present invention.

Referring to FIG. 9, according to lock screen activation, the control unit 160 may output a lock screen 40 on the touchscreen 140 as shown by screen 901. Here, the lock screen 40 may contain a shortcut menu region 45. The shortcut menu region 45 may include preset shortcut menu items. For example, the shortcut menu region 45 includes one shortcut menu item at screen 901, two shortcut menu items at screen 903, three shortcut menu items at screen 905, and four shortcut menu items at screen 907.

Referring to FIG. 10, a menu item in the shortcut menu region 45 may be activated when it is moved a given distance or more from the shortcut menu region 45. For example, after a camera item 11 in the shortcut menu region 45 is selected as shown by screen 1001, when the camera item 11 is moved a given distance or more from the shortcut menu region 45 as shown by screen 1003 and screen 1005, the control unit 160 may activate a user function associated with the camera item 11 while exhibiting the concrete object as the camera icon is dragged to another location. Alternatively, when movement speed of the camera item 11 is greater than or equal to a threshold value, the control unit 160 may activate a user function associated with the camera item 11.

As shown, when the camera item 11 is moved from the lock screen 40, the control unit 160 may generate a concrete object by modifying the amorphous object according to an input event causing the camera item 11 to be moved. That is, the control unit 160 may generate ripples, water splits, or water spray according to movement of the camera item 11. In FIG. 10, ripples in the form of concentric circles centered at the position of the camera item 11 are generated for illustrative purpose. Similarly as before, after generation and/or cancellation of the ripples, the control unit 160 may represent the number of circular waves, ratio of overlapping circular waves, or degree of superposition with reversed ripples as a parameter value, and unlock the lock screen 40 when the parameter value is greater than or equal to a preset threshold.

Thereafter, when the camera function is activated if the condition is satisfied for unlocking, the control unit 160 may unlock the lock screen 40 and control an operation to output a preview image on the touchscreen 140. To achieve this, the mobile terminal 100 may further include a camera module. As explained here, the shortcut menu region 45 may contain various items mapped with specific user functions according to designer or user settings. Hence, a user function other than the camera function may be activated using an item contained in the shortcut menu region 45.

Figure 11:
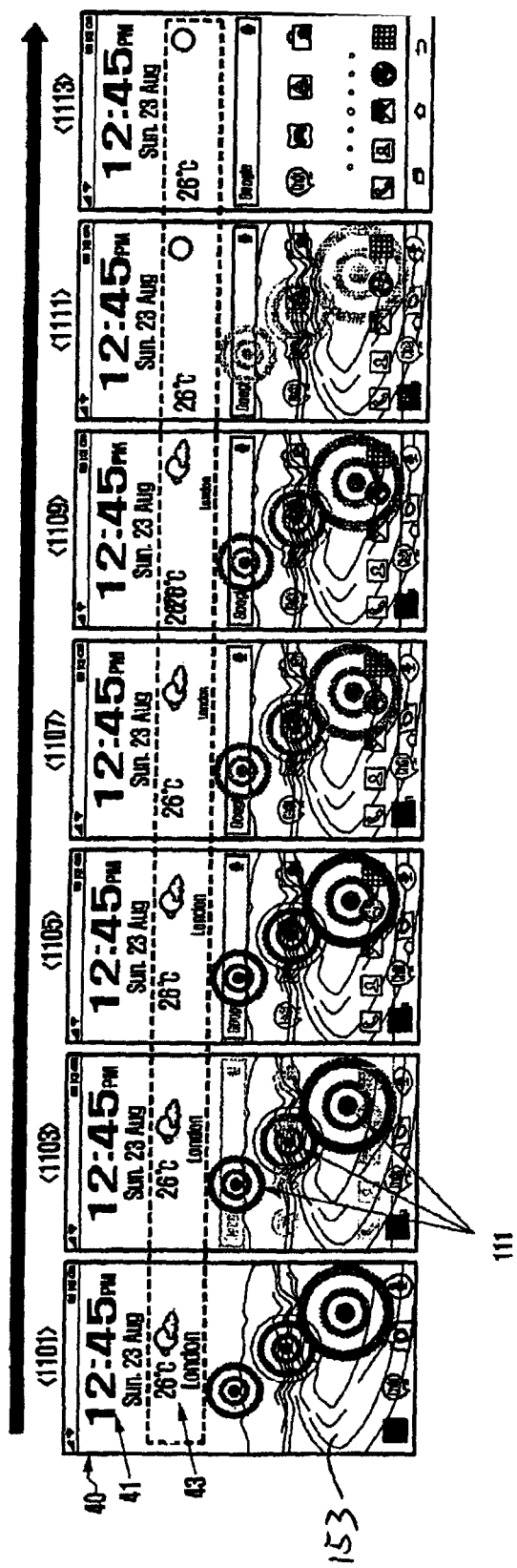
FIG. 11 illustrates lock screen manipulation for unlocking the lock screen in accordance with an exemplary embodiment of the present invention.

FIG. 11 illustrates lock screen manipulation for unlocking the lock screen.

Referring to FIG. 11, according to lock screen activation, the control unit 160 may output a lock screen 40 on the touchscreen 140 as shown by screen 1101. After outputting the lock screen 40, when the user generates an input event (touch and drag gesture) on the touchscreen 140 to unlock the lock screen 40, the control unit 160 may generate stone skipping ripples 111 according to the touch and drag gesture as shown by screens 1101 to 1113. The stone skipping ripples 111 may be sustained for a given time. With passage of time, the stone skipping ripples 111 are removed from the touchscreen 140 and the amorphous object is restored.

The control unit 160 may check whether at least one of the touch and drag gesture and the stone skipping ripples 111 satisfy the lock release condition discussed earlier, For example, the number of circular waves, ratio of overlapping circular waves, or degree of superposition with reversed ripples are represented as a parameter value, and when the parameter value is greater than or equal to a preset threshold, the screen is unlocked. When the lock release condition is satisfied, the control unit 160 may gradually remove the lock screen 40 from the touchscreen 140 as shown by screens 1103 to 1113. Here, the control unit 160 may control the weather information region 43 to be located at the same position before and after unlocking the lock screen 40. That is, the control unit 160 may output the weather information region 43 at the same position on the screen before and after unlocking the lock screen 40. The control unit 160 may skip this operation when the lock screen 40 does not contain the weather information region 43.

Figure 12:
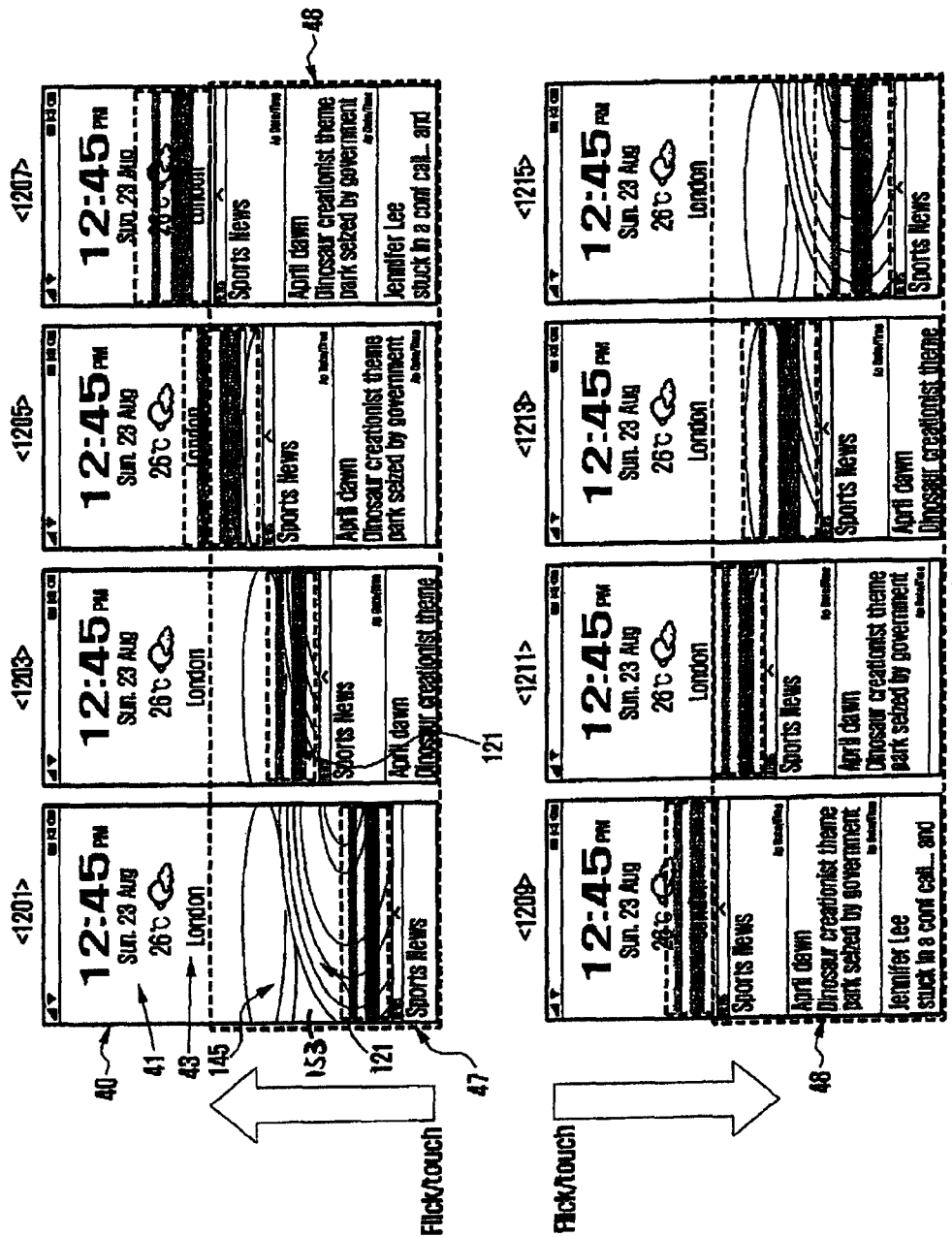
FIG. 12 illustrates lock screen manipulation for ticker region output in accordance with an exemplary embodiment of the present invention.

FIG. 12 illustrates lock screen manipulation for ticker region output in accordance with an embodiment of the present invention.

Referring to FIG. 12, according to lock screen activation, the control unit 160 may output a lock screen 40 on the touchscreen 140 as shown by screen 1201. Here, the lock screen 40 may contain a time information region 41, a weather information region 43, and a ticker region 47. When the lock screen 40 is output, the ticker region 47 may be output together with other information regions or output alone according to user invocation or occurrence of a news item.

The ticker region 47 is used to output information received from the outside or system information in real time or at regular intervals. To achieve this, the control unit 160 may activate the communication unit 110, establish a communication channel with a server providing desired information, and receive information in real time or at regular intervals. The control unit 160 may also output email related information, message related information, document related information, or schedule related information as system information to the ticker region 47. Note that the information output to the ticker region 47 may be adjusted according to user settings. In FIG. 12, the ticker region 47 is used to output news highlights.

The user may adjust the size of the ticker region 47. For example, when the user generates an input event for enlarging the ticker region 47 on the lock screen 40 by pointing and moving 121 region upward, the ticker region 47 may be enlarged as shown by screens 1203, 1205 and 1207. Here, the ticker region 47 may be output differently according to movement of a touch and move gesture like drag, sweep or flick. Alternatively, the ticker region 47 may be gradually enlarged from a state indicated by screen 1201 to a state indicated by screen 1207 via intermediate states indicated by screens 1203 and 1205 according to movement of a touch and move gesture.

When an input event for invoking or enlarging the ticker region 47 is generated, the control unit 160 may generate a concrete object by modifying the amorphous object according to the input event. To achieve this, the lock screen 40 may include water as the amorphous object 153 and a base layer 145 supporting the amorphous object 153. When the ticker region 47 is output in response to user invocation or a specific event after the lock screen 40 is output (i.e., initially, the ticker region 47 was not included in the lock screen 40), the control unit 160 may modify the amorphous object according to output of the ticker region 47. Here, the control unit 160 may generate ripples in consideration of the boundary of the ticker region 47 facing the amorphous object. Hence, when the ticker region 47 is output so as to cover all the lower portion of the touchscreen 140, the ripples may take a form of linear wave patterns 121 propagating in an upward direction. That is, the control unit 160 may generate a number of sets of circular ripples at regular intervals in a region above the ticker region 47. Then, interference and superposition between waves of the circular ripples may cause generation of linear wave patterns 121.

The control unit 160 may not recognize generation of multiple sets of ripples caused by output of the ticker region 47 in the presence of the lock screen 40 as an input event for unlocking the lock screen 40. That is, the control unit 160 may generate concrete objects using ripples in accordance with output or enlargement of the ticker region 47 in the presence of the lock screen 40. In addition, the control unit 160 may recognize linear wave patterns 121 generated by multiple sets of ripples corresponding to output of the ticker region 47 as an input event for unlocking the lock screen 40 according to user settings.

When a specific input event occurs while the enlarged ticker region 48 is output as shown by screen 1207 or 1209, the control unit 160 may gradually restore the original ticker region 47 as shown by screen 1215 via intermediate states indicated by screens 1211 and 1213. Here, the input event may be a touch gesture like drag, flick or sweep occurring in a direction for reducing the enlarged ticker region 48. Alternatively, the input event may correspond to tilting of the mobile terminal 100 in a direction for reducing the enlarged ticker region 48. The ticker region is enlarged when it is in a state indicated by screen 1203 or 1205 compared with when it is in a state indicated by screen 1201.

The ticker region may overlap with the shortcut menu region. To address this, when the ticker region is invoked after the shortcut menu region is output, the control unit 160 may display the ticker region as an overlay on the shortcut menu region. When the shortcut menu region is invoked after the ticker region is output, the control unit 160 may display the shortcut menu region as an overlay on the ticker region. The control unit 160 may also display both the shortcut menu region and the ticker region on the lock screen 40 through position rearrangement.

Figure 13:
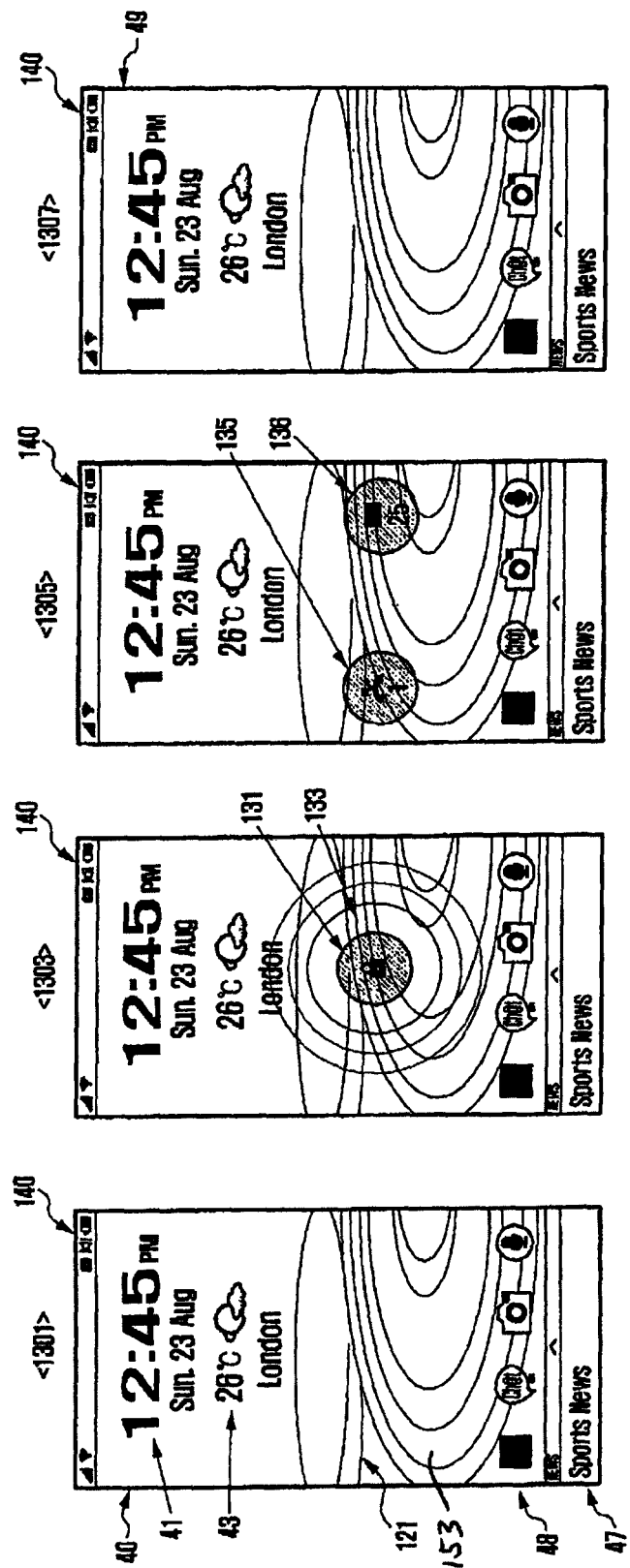
FIG. 13 illustrates lock screen manipulation for outputting various items in accordance with an exemplary embodiment of the present invention.

FIG. 13 illustrates lock screen manipulation for outputting various items in accordance with an embodiment of the present invention.

Referring to FIG. 13, according to lock screen activation, the control unit 160 may output a lock screen 40 on the touchscreen 140 as shown by screen 1301. Here, the lock screen 40 may contain a time information region 41 to output time information, a weather information region 43 to output weather information, a shortcut menu region 48 to output shortcut menu items, and a ticker region 47 to output ticker information. The shortcut menu region 48 and ticker region 47 may be output in response to a user request, and may be not included initially in the lock screen 40. That is, the control unit 160 may output the shortcut menu region 48 or ticker region 47 in response to a specific input event occurring after the lock screen 40 containing the time information region 41 and weather information region 43 is output. The lock screen 40 may include an amorphous object and a base layer supporting the amorphous object. The time information region 41, weather information region 43, shortcut menu region 48, and ticker region 47 may be placed on a layer above the amorphous object. In this case, the time information region 41, weather information region 43, shortcut menu region 48, and ticker region 47 may be not distorted when ripples are generated according to generation of a concrete object from the amorphous object. Alternatively, when such regions are placed below the amorphous object and above the base layer, they may be distorted according to modification of the amorphous object into a concrete object.

Input events for activating or deactivating the shortcut menu region 48 and ticker region 47 may be different events or a repetition of the same event. The shortcut menu region 48 and ticker region 47 may be output at once or be hidden at once according to a specific input event. After at least one of the shortcut menu region 48 and the ticker region 47 is invoked and output on the touchscreen 140, the control unit 160 may generate linear wave patterns 121 as shown according to enlargement of the output region. That is, the linear wave patterns 133 in a circular pattern are generated when the icon 131 is displayed. When at least one of the shortcut menu region 48 and the ticker region 47 is deleted from the touchscreen 140, the control unit 160 may also generate linear wave patterns 121. Here, the direction of linear wave patterns 121 generated when the invoked region is output on the touchscreen 140 may be the same as or be opposite to that of linear wave patterns 121 generated when the region is deleted from the touchscreen 140.

To unlock the lock screen 40, the control unit 160 may output a release item 131 on the lock screen 40 as shown by screen 1303. When a preset input event is detected, the control unit 160 may output a release item 131 on the lock screen 40. The input event for activating or deactivating the release item 131 may correspond to a touch event like tap, sweep, or flick on the lock screen 40 or to tilting or shaking of the mobile terminal 100 in a direction as discussed earlier. Alternatively, when the user moves the release item 131 a given distance or more or at a given speed or more in a desired direction, the control unit 160 may unlock the lock screen 40. Further, when the user enters a double tap on the release item 131, the control unit 160 may also unlock the lock screen 40.

When the release item 131 is output on the lock screen 40, the control unit 160 may generate ripples 133 in the form of concentric circles around the release item 131. When the user selects the release item 131 or generates an input event for moving the release item 131, the control unit 160 may generate at least one set of ripples around the release item 131 or around the event generation point. The description of the release item 131 is centered on the case of water acting as the amorphous object. In the case where land acts as the amorphous object, the ripples 133 may take a form of earthquake or crater. As described above, linear wave patterns 121 or ripples may be adapted according to the substance selected as the amorphous object.

The control unit 160 may output information items 135 and 136 on the lock screen 40 to output system information. Here, the information item 135 is a call item indicating missed calls, and the information item 136 is a message item indicating messaging services. Other information items such as an email item and SNS item may also be included. A notification item may be further included to notify an update file received from an external server, a gift file, a file to be received periodically or on demand, a file received from another mobile terminal or server.

Each information item 135 or 136 may be output at a portion of the lock screen 40 in response to occurrence of a corresponding event. Locations of the information items 135 and 136 may be automatically adjusted according to the number of items to be output. For example, when one information item is output, the information item may be placed at the center of the lock screen 40. When another information item is output, their locations may be rearranged on the lock screen 40 as shown by screen 1305.

Similar to the case of the release item 131, the control unit 160 may generate ripples when the information item 135 or 136 is output. That is, when the information item 135 or 136 is output, the control unit 160 may generate ripples around the output location. Thereafter, when an input event for selecting the information item 135 or 136 is generated, the control unit 160 may generate ripples corresponding to the input event. The information items 135 and 136 may be output on the lock screen 40 together with the release item 131.

In screen 1307, a play ticker region 49 for playback of an audio file is output at a portion of the lock screen 40. The play ticker region 49 may be output at a position different from that of the ticker region 47 described in connection with FIG. 12. The play ticker region 49 may be used to output the title of an audio file being played back and commands such as play, stop, pause, fast forward and rewind. Like the ticker region 47 described before, the play ticker region 49 may be enlarged according to user manipulation to output detailed information of the audio file being played back such as lyrics, audio file directories, album description, and playlist with shuffle and automatic playback options.

The play ticker region 49 is a region that is output according to a user request, and may be output after the lock screen 40 is output. When the play ticker region 49 is output in the presence of the lock screen 40, the control unit 160 may generate linear wave patterns in various forms on the lock screen 40. When an audio file is played back before the lock screen 40 is activated, the play ticker region 49 and the lock screen 40 may be output at the same time.

The release item 131 depicted in screen 1305 may be displayed so as to float on the amorphous object. Here, ripples may be periodically generated around the release item 131 depending upon flotation types. When an input event is generated while the release item 131 is afloat at a fixed position on the amorphous object, the release item 131 may be drifted in a direction or be sunken at least in part into the amorphous object. When an input event for selecting the release item 131 is generated while the release item 131 is afloat in a random direction on the amorphous object, the release item 131 may be fixed at a given position. This flotation feature may be applied to the information items described in screen 1307 in addition to the release item 131. When multiple items are output on the touchscreen 140, they may be afloat in a random or preset manner. When the items collide with each other while afloat, they may float in different directions. Although the items collide with each other while afloat, they may move in desired directions without collision effects. The control unit 160 may display both the release item and the information items as a floating item or display one of the release item and the information items as a floating item according to user settings. That is, the control unit 160 may display at least one of the release item and the information items as a floating item. A non-floating item may be fixed at a given position, and ripples may be generated around the non-floating item according to occurrence of an input event or to a given period. Due to periodic ripple generation, the user may readily recognize a specific item on the lock screen.

Figure 14:
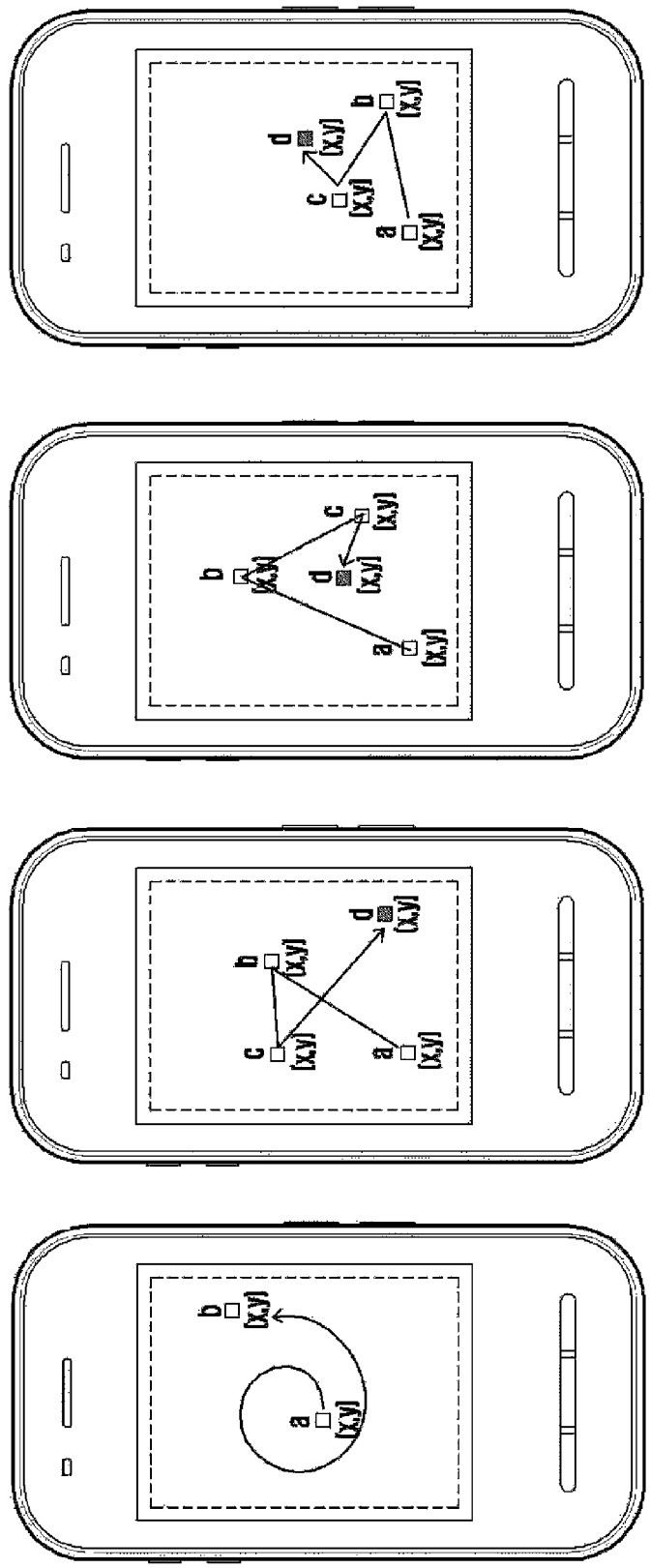
FIG. 14 illustrates various gestures applicable to lock screen manipulation in accordance with an exemplary embodiment of the present invention.

As described above, in the present invention, the screen interface is configured to include a lock screen 40 containing an amorphous object. In response to occurrence of an input event, a concrete object is generated on the lock screen 40 by modifying the amorphous object, thus providing dynamic and intuitive screen manipulation. Hence, the user can manipulate the lock screen 40 in an appealing way. For example, to unlock the lock screen 40, as illustrated in FIG. 14, various touch gestures such as a spiral gesture, random gesture, triangular gesture, and zigzag gesture is represented as a parameter value for accumulation and when the accumulated parameter value satisfies the lock release condition, the lock screen 40 is unlocked. That is, as different movement occurs on the touch screen, concrete objects as described in the earlier embodiments are generated along the path of patterns shown in FIG. 14, and that the ripple effects, for example, is detected therefrom for a comparison to a threshold value in order to determine if the condition for unlocking is satisfied. That is, according to the teachings of the present invention, as a user moves a finger in various directions and form as shown in FIG. 4, concrete objects displayed on the screen would be altered, and the amount of change such as ripple effects due to the finger movement is detected, and depending of the amount of ripple effects detected thereon, the lock release condition can be met.

If necessary, the mobile terminal 100 may further include various components. That is, although not shown, the mobile terminal 100 may further include a short-range communication module for short-range communication, a data communication interface based on wired and wireless communication, an Internet communication module for Internet access, and a digital broadcast receiving module for playing digital broadcasts. With the digital convergence trend, it should be apparent to those skilled in the art that the mobile terminal 100 may further include a unit comparable to the above-described units, and one unit of the mobile terminal 100 may be removed or replaced with another unit.

The mobile terminal 100 of the present invention may be a device capable of collecting audio signals using a microphone, and may be any information and communication appliance or multimedia appliance, such as a mobile communication terminal based on communication protocols supporting various communication systems, a portable multimedia player (PMP), a digital broadcast receiver, a personal digital assistant (PDA), a music player like an MP3 player, a portable game console, a smartphone, a laptop computer, or a handheld computer.

In a feature of the present invention, the mobile terminal and lock screen operation method for the same present a lock screen that is appealing, easy to use and user-friendly. Hence, the user may manipulate the mobile terminal in a more adaptive and dynamic way.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium for example a communication signal carried over a wired or wireless connection and embodiments suitably encompass the same.

Although exemplary embodiments of the present invention have been described in detail hereinabove, it should be understood that many variations and modifications of the basic inventive concept described herein will still fall within the spirit and scope of the present invention as defined in the appended claims.

What is claimed is:

1. A mobile terminal supporting screen operation, comprising:
   a touchscreen displaying an amorphous object having the appearance of a body of liquid, a gas, or a solid composed of sand, soil, gravel or glass; and
   a control unit controlling the touchscreen for outputting a screen providing the amorphous object, and in response to an input event generated by a touch and drag gesture made on the amorphous object, providing a visual effect to the amorphous object according to at least one of a movement path of the touch and drag gesture and speed thereof, and performing an unlocking function of the mobile terminal when the visual effect meets a preset condition;
   wherein,
   the control unit represents an amount of the visual effect as an accumulated parameter value, and performs the unlocking function when the accumulated parameter value is greater than or equal to a preset threshold, coinciding with the visual effect meeting the preset condition, and the accumulated parameter value is determined as a number of ripples, a number of overlapping ripples, a ratio of overlapping ripples, or a degree of superposition with reversed ripples.

2. The mobile terminal of claim 1, wherein the control unit further controls the touchscreen to display, responsive to another touch gesture, a further visual effect in the form of multiple sets of ripples generated at a predetermined interval.

3. The mobile terminal of claim 1, wherein the control unit further controls the touchscreen to display, responsive to another touch gesture, a further visual effect in the form of reversed ripples generated when circular waves of ripples are bounced off a boundary of the touchscreen.

4. The mobile terminal of claim 1, wherein the control unit further controls the touchscreen to display, responsive to another touch gesture, a further visual effect in the form of deformed ripples generated when waves of multiple sets of ripples overlap causing constructive or destructive interference.

5. The mobile terminal of claim 1, wherein the touchscreen displays, when the mobile terminal is tilted, a modified density or arrangement of the amorphous object according to leaning toward a direction of the tilting.

6. The mobile terminal of claim 1, wherein the amorphous object has the appearance of at least one of the liquid, the gas and the solid without a definite shape.

7. The mobile terminal of claim 1, wherein the accumulated parameter value is determined as the number of ripples.

8. The mobile terminal of claim 1, wherein the screen comprises at least one of:
a base layer placed below the amorphous object;
a time information region to output time information; and
a weather information region to output weather information.

9. The mobile terminal of claim 8, wherein at least one of the base layer, the time information region and the weather information region is displayed in a distorted form when the visual effect is provided.

10. The mobile terminal of claim 1, wherein the screen further comprises at least one of:
a shortcut menu region to output at least one shortcut menu item;
a ticker region to output information on received data; and
a play ticker region to support playback or play control of an audio file.

11. The mobile terminal of claim 10, wherein the touchscreen outputs, in response to an event activating at least one of the shortcut menu region, the ticker region and the play ticker region, the activated region, and displays linear wave patterns as the visual effect according to output of the activated region.

12. The mobile terminal of claim 10, wherein the control unit activates, when a shortcut menu item of the shortcut menu region is moved for a predefined distance or more or at a predefined speed or more from the shortcut menu region, a user function associated with the shortcut menu item.

13. The mobile terminal of claim 1, wherein the screen further comprises at least one of:
a release item to support unlocking of a lock function of the screen; and
at least one information item to output received information.

14. The mobile terminal of claim 13, wherein the touchscreen displays at least one of:
at least one of the release item floating on the amorphous object and the information item; and
ripples of concentric circles around at least one of the release item and the information item.

15. The mobile terminal of claim 1, wherein the amorphous object corresponds to at least one of:
the liquid without a definite shape;
the gas including wind, fire, fog or vapor; and
the solid including land composed of soil, sand and gravel or a glass window displayable as a flat surface on the touchscreen.

16. The mobile terminal of claim 1, wherein the accumulated parameter value is determined as the number of overlapping ripples.

17. The mobile terminal of claim 1, wherein the accumulated parameter value is determined as ratio of overlapping ripples.

18. The mobile terminal of claim 1, wherein the accumulated parameter value is determined as the degree of superposition of reversed ripples.

19. A screen operation method for a mobile terminal, comprising:
displaying a screen containing an amorphous object having the appearance of a body of liquid, a gas, or a solid composed of sand, soil, gravel or glass;
detecting an input event generated by a touch and drag gesture made on the amorphous object, and in response, providing a visual effect to the amorphous object according to at least one of a movement path of the touch and drag gesture and speed thereof; and
performing an unlocking function of the mobile terminal when visual effect meets a preset condition;
wherein,
an amount of the visual effect is represented as an accumulated parameter value, and the unlocking function is performed when the accumulated parameter value is greater than or equal to a preset threshold, coinciding with the visual effect meeting the preset condition, and
the accumulated parameter value is determined as a number of ripples, a number of overlapping ripples, a ratio of overlapping ripples, or a degree of superposition with reversed ripples.

20. The screen operation method of claim 19, further comprising displaying, responsive to another touch gesture, a further visual effect in the form of multiple sets of ripples generated at a predetermined interval.

21. The screen operation method of claim 19, further comprising displaying, responsive to another touch gesture, a further visual effect in the form of reversed ripples generated when circular waves of ripples are bounced off the boundary of the touchscreen.

22. The screen operation method of claim 19, further comprising displaying, responsive to another touch gesture, a further visual effect in the form of deformed ripples generated when waves of multiple sets of ripples overlap, causing constructive or destructive interference.

23. The screen operation method of claim 19, further comprising at least one of:
displaying a base layer placed below the amorphous object;
displaying a time information region at a portion of the screen to output time information; and
displaying a weather information region at a portion of the screen to output weather information.

24. The screen operation method of claim 23, wherein at least one of the base layer, the time information region and the weather information region is displayed in a distorted form when visual effect is provided.

25. The screen operation method of claim 19, further comprising at least one of:
displaying a shortcut menu region at a portion of the screen to output at least one shortcut menu item;
displaying a ticker region at a portion of the screen to output information on received data; and
displaying a play ticker region at a portion of the screen to support playback or play control of an audio file.

26. The screen operation method of claim 25, further comprising at least one of:
outputting, in response to an event activating at least one of the shortcut menu region, the ticker region and the play ticker region, the activated region, and displaying linear wave patterns according to output of the activated region; and
activating, when a shortcut menu item of the shortcut menu region is moved for a predefined distance or more or at a predefined speed or more from the shortcut menu region, a user function associated with the shortcut menu item.

27. The screen operation method of claim 19, further comprising at least one of:
displaying a release item at a portion of the screen to support unlocking of a lock function of the screen; and
displaying at least one information item at a portion of the screen to output received information.

28. The screen operation method of claim 27, further comprising at least one of:
displaying at least one of the release item and the information item afloat on the amorphous object; and
displaying ripples of concentric circles around at least one of the release item and the information item.

29. The screen operation method of claim 19, further comprising at least one of:
receiving another touch and drag gesture that is moved for a predefined distance or more on a touchscreen displaying the amorphous object; and
generating stone skipping ripples along the path of said another touch and drag gesture and unlocking a lock of the screen.

30. The screen operation method of claim 19, wherein the amorphous object corresponds to at least one of the liquid without a definite shape, the gas including wind, fire, fog or vapor, and the solid including land composed of soil, sand and gravel or a glass window displayable as a flat surface on a touchscreen.

* * * * *